US011438813B2

(12) United States Patent
Kadiri et al.

(10) Patent No.: US 11,438,813 B2
(45) Date of Patent: Sep. 6, 2022

(54) ENHANCED USER EQUIPMENT CAPABILITY EXCHANGE DURING HANDOVER

(71) Applicant: QUALCOMM Incorporated, San Diego, CA (US)

(72) Inventors: Prasad Reddy Kadiri, San Diego, CA (US); Alberto Rico Alvarino, San Diego, CA (US); Umesh Phuyal, San Diego, CA (US); Arash Mirbagheri, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/889,540

(22) Filed: Jun. 1, 2020

(65) Prior Publication Data

US 2021/0092654 A1    Mar. 25, 2021

Related U.S. Application Data

(60) Provisional application No. 62/856,990, filed on Jun. 4, 2019.

(51) Int. Cl.
*H04W 4/00* (2018.01)
*H04W 36/00* (2009.01)
(Continued)

(52) U.S. Cl.
CPC ......... *H04W 36/0072* (2013.01); *H04W 8/24* (2013.01); *H04W 36/0061* (2013.01); *H04W 36/18* (2013.01)

(58) Field of Classification Search
None
See application file for complete search history.

(56) References Cited

U.S. PATENT DOCUMENTS

2018/0049073 A1* 2/2018 Dinan ............... H04W 4/44
2018/0199251 A1* 7/2018 Kim ................. H04W 72/14
(Continued)

FOREIGN PATENT DOCUMENTS

WO   WO-2017163670 A1   9/2017
WO   WO-2019069285 A1   4/2019
WO   WO-2020167230 A1   8/2020

OTHER PUBLICATIONS

International Search Report and Written Opinion—PCT/US2020/035698—ISA/EPO—dated Sep. 14, 2020.
(Continued)

*Primary Examiner* — Suhail Khan
(74) *Attorney, Agent, or Firm* — Qualcomm Incorporated

(57) ABSTRACT

Methods, systems, and devices for wireless communications and capability signaling for enhanced handover processes are described. A user equipment (UE) may transmit, to a source base station, a band combination indicator to indicate at least one band combination supported by the UE. The source base station may transmit a source base station configuration and at least one band combination supported by the UE to a target base station for use during a handover procedure. The target base station may then transmit to the source base station, a target base station configuration to use in the handover procedure. The source base station may transmit to the UE, both base station configurations to be applied during the handover procedure which may include a number of band combinations. The UE may communicate during handover execution with both base stations using at least one band combination indicated in the received base station configurations.

54 Claims, 22 Drawing Sheets

(51) Int. Cl.
  *H04W 8/24* (2009.01)
  *H04W 36/18* (2009.01)

(56) References Cited

U.S. PATENT DOCUMENTS

2020/0145888 A1  5/2020  Paladugu et al.
2020/0351729 A1* 11/2020  Rastegardoost .. H04W 36/0072

OTHER PUBLICATIONS

Nokia, et al., "Report from [104#61 ] [LTE/feMOB] Solution Directions for Minimizing User Data Interruption for UL/DL (Nokia)", 3GPP Draft, 3GPP TSG-RAN WG2 Meeting #105, R2-1900619 Report From [104#61 ] [LTEFEMOB] Solution Directions for Minimizing User Data Interruption, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 13, 2019 (Feb. 13, 2019), XP051597319, 49 pages, Retrieved from the Internet: URL: http://www.3gpp.org/ftp/tsg%5Fran/WG2%5FRL2/TSGR2%5F105/Docs/R2%2D1900619%2Ezip [retrieved on Feb. 13, 2019] 2.1 Split bearer Solutions 1.1-1.5, p. 27, paragraph 2.2.7-p. 32, paragraph 2.2.9.

Qualcomm Incorporated et al., "LTE UE Capability Sharing Aspects for DAPS Based Enhanced MBB HO", 3GPP Draft, 3GPP TSG-RAN WG2 Meeting #107bis, R2-1912822 LTE UE Capability Sharing Aspects for DAPS Based EMBB HO_V3, 3rd Generation Partnership Project (3GPP), Mobile Competence Centre, 650, Route Des Lucioles, F-06921, Sophia-Anti, vol. RAN WG2, No. Chongqing, China, Oct. 14-Oct. 18, 2019 Oct. 4, 2019 (Oct. 4, 2019), XP051790858, 7 Pages, Retrieved from the Internet: URL:http://www.3gpp.org/ftp/tsg_ran/WG2_RL2/TSGR2_107bis/Docs/R2-1912822.zip [retrieved on Oct. 4, 2019] the whole document.

Qualcomm Incorporated: "LTE Mobility Enhancements for eMBB HO Using Dual Active Protocol Stack", 3GPP Draft, 3GPP TSG-RAN WG2 Meeting #106, R2-1906378 LTE Mobility Enhancements for EMBB HO Using Dual Active Protocol Stack_V1, 3rd Generation Partnership Project (3GPP), Mobile Competence Centre, 650, Route Des Lucioles, F-0692, vol. RAN WG2, No. Reno, USA, May 13-May 17, 2019 May 13, 2019 (May 13, 2019), XP051729843, 10 Pages, Retrieved from the Internet: URL:http://www.3gpp.org/ftp/Meetings%5F3GPP%5FSYNC/RAN2/Docs/R2%2D1906378%2Ezip [retrieved on May 13, 2019] the whole document.

* cited by examiner

ENHANCED USER EQUIPMENT CAPABILITY EXCHANGE DURING HANDOVER

CROSS REFERENCE

The present application for patent claims the benefit of U.S. Provisional Patent Application No. 62/856,990 by KADIRI et al., entitled "ENHANCED USER EQUIPMENT CAPABILITY EXCHANGE DURING HANDOVER," filed Jun. 4, 2019, assigned to the assignee hereof, and expressly incorporated by reference herein.

FIELD OF TECHNOLOGY

The following relates generally to wireless communications and more specifically to enhanced user equipment capability exchange during handover.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). A UE may communicate with a base station (referred to as a source base station) as part of an active connection on a selected serving cell. In some implementations, however, a UE may experience degraded signal quality or other communication challenges within the wireless communications system. Based on the variation in signal quality or other parameters, the UE may be handed over to a different base station (referred to as a target base station) within the wireless communications system.

In some wireless communications systems (e.g., NR systems), a UE may undergo a handover procedure in which the UE changes a connection between a source and target base station. In some cases, however, signaling methods used to coordinate such handover processes between devices in the wireless network may be deficient.

SUMMARY

The described techniques relate to improved methods, systems, devices, and apparatuses that support enhanced user equipment capability exchange during enhanced make before break (eMBB) handover. Generally, the described techniques provide for signaling enhancements that may be used to allocate capabilities of a given user equipment (UE) between a source base station with which the UE is currently connected and a different base station (e.g., a target base station) during a handover process. In some cases, a UE may transmit, to the source base station, an eMBB indicator for a given band combination supported by the UE. The band indicator may in some aspects contain a single band combination supporting handover or a number of different band combinations supported by the UE for carrier aggregation.

The source base station may receive the band combination indicator which indicates the at least one band combination supported by UE. In some cases, the band combination indicator may indicate a single band combination supporting handover from a number of different band combinations that is supported, a number of different band combinations that are supported, or number of band combinations that are interchangeably supported by the UE for carrier aggregation. Alternatively or additionally, the band combination indicator may indicate a first set of one or more band combinations supported by the UE for the source base station and a second, different set of one or more band combinations supported by the for a target base station.

The source base station may transmit a source base station configuration to the target base station. The source base station configuration may be applied during and/or after handover execution using at least one band combination supported by the UE. The target base station may then transmit a target base station configuration to be applied during handover execution based on the received source base station configuration and the at least one band combination supported by the UE. The target base station configuration may in some cases indicate a second band of the at least one band combination. After receiving the target base station configuration, the source base station may transmit the source base station configuration and the target base station configuration for the UE to apply during handover execution based on the band combination indicator. The UE may then communicate with the source base station during a handover execution period using the first band indicated in the source base station configuration, and may communicate with the target base station during the handover execution period using the second band indicated in the target base station configuration. In some cases, the UE may communicate with both source and target cells during handover using a same band and/or a same carrier frequency. In some cases, the UE may release or keep source eNB SCells in a deactivated state, while the UE may be communicating with a target cell using a target cell configuration.

A method of wireless communications by a UE is described. The method may include transmitting, to a source base station, a band combination indicator that indicates at least one band combination supported by the UE, receiving, in response to transmitting the band combination indicator, a target base station configuration to apply during handover execution and a source base station configuration to apply during handover execution, communicating with the source base station during handover execution using a first band of the at least one band combination indicated in the source base station configuration, and communicating with a target base station during handover execution using a second band of the at least one band combination indicated in the target base station configuration.

An apparatus for wireless communications by a UE is described. The apparatus may include a processor, memory coupled with the processor, and instructions stored in the memory. The instructions may be executable by the processor to cause the apparatus to transmit, to a source base station, a band combination indicator that indicates at least one band combination supported by the UE, receive, in response to transmitting the band combination indicator, a target base station configuration to apply during handover execution and a source base station configuration to apply during handover execution, communicate with the source base station during handover execution using a first band of the at least one band combination indicated in the source base station configuration, and communicate with a target base station during handover execution using a second band of the at least one band combination indicated in the target base station configuration.

Another apparatus for wireless communications by a UE is described. The apparatus may include means for transmitting, to a source base station, a band combination indicator that indicates at least one band combination supported by the UE, receiving, in response to transmitting the band combination indicator, a target base station configuration to apply during handover execution and a source base station configuration to apply during handover execution, communicating with the source base station during handover execution using a first band of the at least one band combination indicated in the source base station configuration, and communicating with a target base station during handover execution using a second band of the at least one band combination indicated in the target base station configuration.

A non-transitory computer-readable medium storing code for wireless communications by a UE is described. The code may include instructions executable by a processor to transmit, to a source base station, a band combination indicator that indicates at least one band combination supported by the UE, receive, in response to transmitting the band combination indicator, a target base station configuration to apply during handover execution and a source base station configuration to apply during handover execution, communicate with the source base station during handover execution using a first band of the at least one band combination indicated in the source base station configuration, and communicate with a target base station during handover execution using a second band of the at least one band combination indicated in the target base station configuration.

Some examples of the method, apparatuses, and non-transitory computer-readable medium described herein may further include operations, features, means, or instructions for receiving a capability inquiry, where the band combination indicator may be transmitted based on the capability inquiry.

In some examples of the method, apparatuses, and non-transitory computer-readable medium described herein, receiving the capability inquiry may include operations, features, means, or instructions for receiving the capability inquiry that indicates that an enhanced make before break (eMBB) band combination increases a capability size, where the band combination indicator indicates whether the eMBB band combination may be supported.

Some examples of the method, apparatuses, and non-transitory computer-readable medium described herein may further include operations, features, means, or instructions for transmitting capability signaling that indicates the UE supports enhanced make before break (eMBB) handover based on a UE-supported carrier aggregation (CA) band combination.

Some examples of the method, apparatuses, and non-transitory computer-readable medium described herein may further include operations, features, means, or instructions for transmitting at least one control message to indicate one or more of intra-frequency handover support for a given band, inter-frequency handover support for intra-band and inter-band combinations, asynchronous handover support, time division multiplexing support, radio frequency chain capability, or any combination thereof.

In some examples of the method, apparatuses, and non-transitory computer-readable medium described herein, the at least one control message may be an information element indicated for a band combination supporting enhanced make before break (eMBB) handover.

In some examples of the method, apparatuses, and non-transitory computer-readable medium described herein, transmitting the band combination indicator may include operations, features, means, or instructions for transmitting the band combination indicator to indicate a single band combination supporting handover from a set of different band combinations that may be supported by the UE for carrier aggregation.

In some examples of the method, apparatuses, and non-transitory computer-readable medium described herein, transmitting the band combination indicator may include operations, features, means, or instructions for transmitting the band combination indicator to indicate a set of different band combinations supported by the UE.

In some examples of the method, apparatuses, and non-transitory computer-readable medium described herein, transmitting the band combination indicator may include operations, features, means, or instructions for transmitting the band combination indicator to indicate a first set of one or more band combinations supported by the UE for the source base station and a second set of one or more band combinations supported by the UE for the target base station.

In some examples of the method, apparatuses, and non-transitory computer-readable medium described herein, the first set of one or more band combinations may be different than the second set of band combinations.

In some examples of the method, apparatuses, and non-transitory computer-readable medium described herein, transmitting the band combination indicator may include operations, features, means, or instructions for transmitting the band combination indicator to indicate a set of band combinations that may be interchangeably supported by the UE for the source base station and the target base station.

In some examples of the method, apparatuses, and non-transitory computer-readable medium described herein, transmitting the band combination indicator may include operations, features, means, or instructions for transmitting the band combination indicator to indicate a first band combination supported by the UE for the source base station and a second band combination supported by the UE for the target base station, and transmitting a pointer to indicate that one or more of the first band combination, the second band combination, or both, may be individually supported by the UE.

In some examples of the method, apparatuses, and non-transitory computer-readable medium described herein, transmitting the band combination indicator may include operations, features, means, or instructions for transmitting the band combination indicator that includes a group identifier to indicate a first band combination that may be interchangeably supported by the UE for the source base station and the target base station.

Some examples of the method, apparatuses, and non-transitory computer-readable medium described herein may further include operations, features, means, or instructions for receiving a handover instruction to handover the UE from the source base station to the target base station, and communicating with the source base station after handover execution using the first band and communicating with the target base station after handover execution using the second band.

Some examples of the method, apparatuses, and non-transitory computer-readable medium described herein may further include operations, features, means, or instructions for receiving a time division multiplexing pattern, receiving a handover instruction to handover the UE from the source base station to the target base station, and communicating with the source base station after handover execution using the first band and communicating with the target base station after handover execution using the second band based on the time division multiplexing pattern.

Some examples of the method, apparatuses, and non-transitory computer-readable medium described herein may further include operations, features, means, or instructions for receiving, based on the band combination indicator, a second target base station configuration to apply after releasing a connection with the source base station by the UE, releasing the connection with the source base station, and communicating with the target base station after releasing the connection using the first band, the second band, or both, based on the second target base station configuration.

In some examples of the method, apparatuses, and non-transitory computer-readable medium described herein, transmitting the band combination indicator may include operations, features, means, or instructions for transmitting the band combination indicator that indicates a first band combination that may be not a fallback of a different band combination.

In some examples of the method, apparatuses, and non-transitory computer-readable medium described herein, transmitting the band combination indicator may include operations, features, means, or instructions for transmitting the band combination indicator that indicates at least one enhanced make before break (eMBB) band combination that may be a fallback of a non-eMBB band combination.

In some examples of the method, apparatuses, and non-transitory computer-readable medium described herein, transmitting the band combination indicator may include operations, features, means, or instructions for transmitting the band combination indicator that indicates an enhanced make before break (eMBB) band combination that may be a fallback of a different band combination of the at least one band combination.

Some examples of the method, apparatuses, and non-transitory computer-readable medium described herein may further include operations, features, means, or instructions for receiving a connection reconfiguration message from the source base station.

Some examples of the method, apparatuses, and non-transitory computer-readable medium described herein may further include operations, features, means, or instructions for maintaining a primary cell connection with the source base station based on the connection reconfiguration message, and releasing or deactivating at least one secondary cell connection with the source base station based on the connection reconfiguration message.

Some examples of the method, apparatuses, and non-transitory computer-readable medium described herein may further include operations, features, means, or instructions for establishing a primary cell connection with the target base station based on the connection reconfiguration message.

Some examples of the method, apparatuses, and non-transitory computer-readable medium described herein may further include operations, features, means, or instructions for establishing at least one secondary cell connection with the target base station based on the connection reconfiguration message.

Some examples of the method, apparatuses, and non-transitory computer-readable medium described herein may further include operations, features, means, or instructions for determining that the connection reconfiguration message instructs the UE to establish a number of connections that exceeds a capability of the UE, and skipping configuring or deactivating at least one secondary cell connection for the target base station to comply with the capability.

In some examples of the method, apparatuses, and non-transitory computer-readable medium described herein, the capability may be a carrier aggregation capability, a multiple input multiple output (MIMO) capability of the UE, or both.

In some examples of the method, apparatuses, and non-transitory computer-readable medium described herein, the handover may be an enhanced make before break handover.

In some examples of the method, apparatuses, and non-transitory computer-readable medium described herein, the first band and the second band may be the same, or the first band and the second band may be different, or the first band and the second band at least partially overlap.

A method of wireless communications by a source base station is described. The method may include receiving a band combination indicator that indicates at least one band combination supported by a UE, transmitting, to the UE, a target base station configuration to apply during handover execution and a source base station configuration to apply during handover execution based on the band combination indicator, and communicating with the UE during handover execution using a first band of the at least one band combination indicated in the source base station configuration.

An apparatus for wireless communications by a source base station is described. The apparatus may include a processor, memory coupled with the processor, and instructions stored in the memory. The instructions may be executable by the processor to cause the apparatus to receive a band combination indicator that indicates at least one band combination supported by a UE, transmit, to the UE, a target base station configuration to apply during handover execution and a source base station configuration to apply during handover execution based on the band combination indicator, and communicate with the UE during handover execution using a first band of the at least one band combination indicated in the source base station configuration.

Another apparatus for wireless communications by a source base station is described. The apparatus may include means for receiving a band combination indicator that indicates at least one band combination supported by a UE, transmitting, to the UE, a target base station configuration to apply during handover execution and a source base station configuration to apply during handover execution based on the band combination indicator, and communicating with the UE during handover execution using a first band of the at least one band combination indicated in the source base station configuration.

A non-transitory computer-readable medium storing code for wireless communications by a source base station is described. The code may include instructions executable by a processor to receive a band combination indicator that indicates at least one band combination supported by a UE, transmit, to the UE, a target base station configuration to apply during handover execution and a source base station configuration to apply during handover execution based on the band combination indicator, and communicate with the UE during handover execution using a first band of the at least one band combination indicated in the source base station configuration.

Some examples of the method, apparatuses, and non-transitory computer-readable medium described herein may further include operations, features, means, or instructions for identifying a maximum UE capability associated with the at least one band combination supported by the UE, and identifying the source base station configuration that is an updated source base station configuration, wherein a combination of the updated source base station configuration and the target base station configuration does not exceed the maximum UE capability, and wherein the source base station configuration is transmitted to the UE based at least in part on the determining.

Some examples of the method, apparatuses, and non-transitory computer-readable medium described herein may further include operations, features, means, or instructions for transmitting, to the target base station, the updated source base station configuration, a power sharing configuration for handover, and one or more UE capabilities including an indication that the UE supports enhanced make before break (eMBB) handover based on a UE supported CA band combination, and receiving the target base station configuration in response to transmitting the source base station configuration and the indication.

In some examples of the method, apparatuses, and non-transitory computer-readable medium described herein, receiving the band combination indicator may include operations, features, means, or instructions for receiving the band combination indicator that indicates a single band combination supporting handover from a set of different band combinations that may be supported by the UE for carrier aggregation.

Some examples of the method, apparatuses, and non-transitory computer-readable medium described herein may further include operations, features, means, or instructions for receiving, from the UE, at least one control message to indicate one or more of intra-frequency handover support for a given band, inter-frequency handover support for intra-band and inter-band combinations, asynchronous handover support, time division multiplexing support, radio frequency chain capability, or any combination thereof.

In some examples of the method, apparatuses, and non-transitory computer-readable medium described herein, the at least one control message may be an information element indicated for a band combination supporting enhanced make before break (eMBB) handover.

In some examples of the method, apparatuses, and non-transitory computer-readable medium described herein, receiving the band combination indicator may include operations, features, means, or instructions for receiving the band combination indicator that indicates a set of different band combinations supported by the UE.

Some examples of the method, apparatuses, and non-transitory computer-readable medium described herein may further include operations, features, means, or instructions for transmitting a capability inquiry to the UE, where the band combination indicator may be received based on the capability inquiry.

In some examples of the method, apparatuses, and non-transitory computer-readable medium described herein, transmitting the capability inquiry to the UE may include operations, features, means, or instructions for transmitting the capability inquiry that indicates that an enhanced make before break (eMBB) band combination increases a capability size, where the band combination indicator indicates whether the eMBB band combination may be supported.

Some examples of the method, apparatuses, and non-transitory computer-readable medium described herein may further include operations, features, means, or instructions for transmitting, to the UE, a second target base station configuration to apply after handover of the UE and after release of the source base station by the UE.

In some examples of the method, apparatuses, and non-transitory computer-readable medium described herein, the first band may be the same as, at least partially overlaps with, or may be different than a second band of the at least one band combination indicated in the target base station configuration.

In some examples of the method, apparatuses, and non-transitory computer-readable medium described herein, receiving the band combination indicator may include operations, features, means, or instructions for receiving the band combination indicator that indicates a first set of one or more band combinations supported by the UE for the source base station and a second set of one or more band combinations supported by the UE for a target base station.

In some examples of the method, apparatuses, and non-transitory computer-readable medium described herein, the first set of one or more band combinations may be different than the second set of band combinations.

In some examples of the method, apparatuses, and non-transitory computer-readable medium described herein, receiving the band combination indicator may include operations, features, means, or instructions for receiving the band combination indicator that indicates a set of band combinations that may be interchangeably supported by the UE for the source base station and a target base station.

In some examples of the method, apparatuses, and non-transitory computer-readable medium described herein, receiving the band combination indicator may include operations, features, means, or instructions for receiving the band combination indicator that indicates a first band combination supported by the UE for the source base station and a second band combination supported by the UE for a target base station, and receiving a pointer to indicate that one or more of the first band combination, the second band combination, or both, may be individually supported by the UE.

In some examples of the method, apparatuses, and non-transitory computer-readable medium described herein, receiving the band combination indicator may include operations, features, means, or instructions for receiving the band combination indicator that includes a group identifier to indicate a first band combination that may be interchangeably supported by the UE for the source base station and a target base station.

Some examples of the method, apparatuses, and non-transitory computer-readable medium described herein may further include operations, features, means, or instructions for transmitting a handover instruction to the UE, and communicating with the UE during and after handover execution using the first band.

Some examples of the method, apparatuses, and non-transitory computer-readable medium described herein may further include operations, features, means, or instructions for transmitting a time division multiplexing pattern, transmitting a handover instruction to the UE, and communicating with the UE during and after handover execution using the first band based on the time division multiplexing pattern.

Some examples of the method, apparatuses, and non-transitory computer-readable medium described herein may further include operations, features, means, or instructions for transmitting, based on the band combination indicator, a second target base station configuration for the UE to apply after releasing a connection with the source base station.

Some examples of the method, apparatuses, and non-transitory computer-readable medium described herein may further include operations, features, means, or instructions for receiving at least one control message to indicate one or more of intra-frequency handover support for a given band, inter-frequency handover support for intra-band and inter-band combinations, asynchronous handover support, time division multiplexing support, radio frequency chain capability, or any combination thereof.

In some examples of the method, apparatuses, and non-transitory computer-readable medium described herein, the at least one control message may be an information element indicated for a band combination supporting enhanced make before break (eMBB) handover.

In some examples of the method, apparatuses, and non-transitory computer-readable medium described herein, receiving the band combination indicator may include operations, features, means, or instructions for receiving the band combination indicator that indicates a first band combination that may be not a fallback of a different band combination.

In some examples of the method, apparatuses, and non-transitory computer-readable medium described herein, receiving the band combination indicator may include operations, features, means, or instructions for receiving the band combination indicator that indicates at least one enhanced make before break (eMBB) band combination that may be a fallback of a non-eMBB band combination.

In some examples of the method, apparatuses, and non-transitory computer-readable medium described herein, receiving the band combination indicator may include operations, features, means, or instructions for receiving the band combination indicator that indicates at least one band combination that may be a fallback of a different band combination and may be a supported band combination in enhanced make before break (eMBB).

Some examples of the method, apparatuses, and non-transitory computer-readable medium described herein may further include operations, features, means, or instructions for transmitting a connection reconfiguration message to the UE.

In some examples of the method, apparatuses, and non-transitory computer-readable medium described herein, the handover may be an enhanced make before break (eMBB) handover.

In some examples of the method, apparatuses, and non-transitory computer-readable medium described herein, transmitting the target base station configuration to apply during handover execution may include operations, features, means, or instructions for transmitting the target base station configuration to apply during handover execution and a modified source base station configuration to apply during handover execution.

A method of wireless communications by a target base station is described. The method may include receiving, from an updated source base station, a source base station configuration to be applied during handover execution and at least one band combination supported by a UE, the source base station configuration indicating a first band of the at least one band combination, transmitting, to the source base station, a target base station configuration to be applied during handover execution based on the source base station configuration and the at least one band combination, the target base station configuration indicating a second band of the at least one band combination, and communicating with the UE during handover execution using the second band based on the target base station configuration.

An apparatus for wireless communications by a target base station is described. The apparatus may include a processor, memory coupled with the processor, and instructions stored in the memory. The instructions may be executable by the processor to cause the apparatus to receive, from a source base station, a source base station configuration to be applied during handover execution and at least one band combination supported by a UE, the source base station configuration indicating a first band of the at least one band combination, transmit, to the source base station, a target base station configuration to be applied during handover execution based on the source base station configuration and the at least one band combination, the target base station configuration indicating a second band of the at least one band combination, and communicate with the UE during handover execution using the second band based on the target base station configuration.

Another apparatus for wireless communications by a target base station is described. The apparatus may include means for receiving, from a source base station, an updated source base station configuration to be applied during handover execution and at least one band combination supported by a UE, the source base station configuration indicating a first band of the at least one band combination, transmitting, to the source base station, a target base station configuration to be applied during handover execution based on the source base station configuration and the at least one band combination, the target base station configuration indicating a second band of the at least one band combination, and communicating with the UE during handover execution using the second band based on the target base station configuration.

A non-transitory computer-readable medium storing code for wireless communications by a target base station is described. The code may include instructions executable by a processor to receive, from a source base station, a source base station configuration to be applied during handover execution and at least one band combination supported by a UE, the source base station configuration indicating a first band of the at least one band combination, transmit, to the source base station, a target base station configuration to be applied during handover execution based on the source base station configuration and the at least one band combination, the target base station configuration indicating a second band of the at least one band combination, and communicate with the UE during handover execution using the second band based on the target base station configuration.

Some examples of the method, apparatuses, and non-transitory computer-readable medium described herein may further include operations, features, means, or instructions for receiving an indication of one or more capabilities of the UE associated with the at least one band combination supported by the UE, and determining the target base station configuration based at least in part on the source base station configuration and the one or more capabilities of the UE.

Some examples of the method, apparatuses, and non-transitory computer-readable medium described herein may further include operations, features, means, or instructions for receiving an indication that the UE supports enhanced make before break (eMBB) handover based on a UE-supported carrier aggregation band combination.

Some examples of the method, apparatuses, and non-transitory computer-readable medium described herein may further include operations, features, means, or instructions for communicating with the UE during and after handover execution using the second band.

Some examples of the method, apparatuses, and non-transitory computer-readable medium described herein may further include operations, features, means, or instructions for receiving a time division multiplexing pattern from the source base station, and communicating with the UE during and after handover execution using the second band based on the time division multiplexing pattern.

Some examples of the method, apparatuses, and non-transitory computer-readable medium described herein may further include operations, features, means, or instructions for receiving power sharing information from the source base station, the power sharing information associated with how the UE allocates transmission power between the source base station and target base station during handover execution, and transmitting the target base station configuration to be applied during handover execution based at least in part on the power sharing information.

Some examples of the method, apparatuses, and non-transitory computer-readable medium described herein may further include operations, features, means, or instructions for transmitting, to the source base station, a second target base station configuration for the UE to apply after releasing a connection with the source base station.

Some examples of the method, apparatuses, and non-transitory computer-readable medium described herein may further include operations, features, means, or instructions for transmitting control signaling or a control element indicating to release the connection with the source base station, and communicating with the UE based on the second target base station configuration.

Some examples of the method, apparatuses, and non-transitory computer-readable medium described herein may further include operations, features, means, or instructions for transmitting, to the UE, a target base station configuration to be applied after handover execution and after release of the source base station.

In some examples of the method, apparatuses, and non-transitory computer-readable medium described herein, the first band and the second band may be the same, or the first band and the second band may be different, or the first band and the second band at least partially overlap.

DETAILED DESCRIPTION

Figure 1:
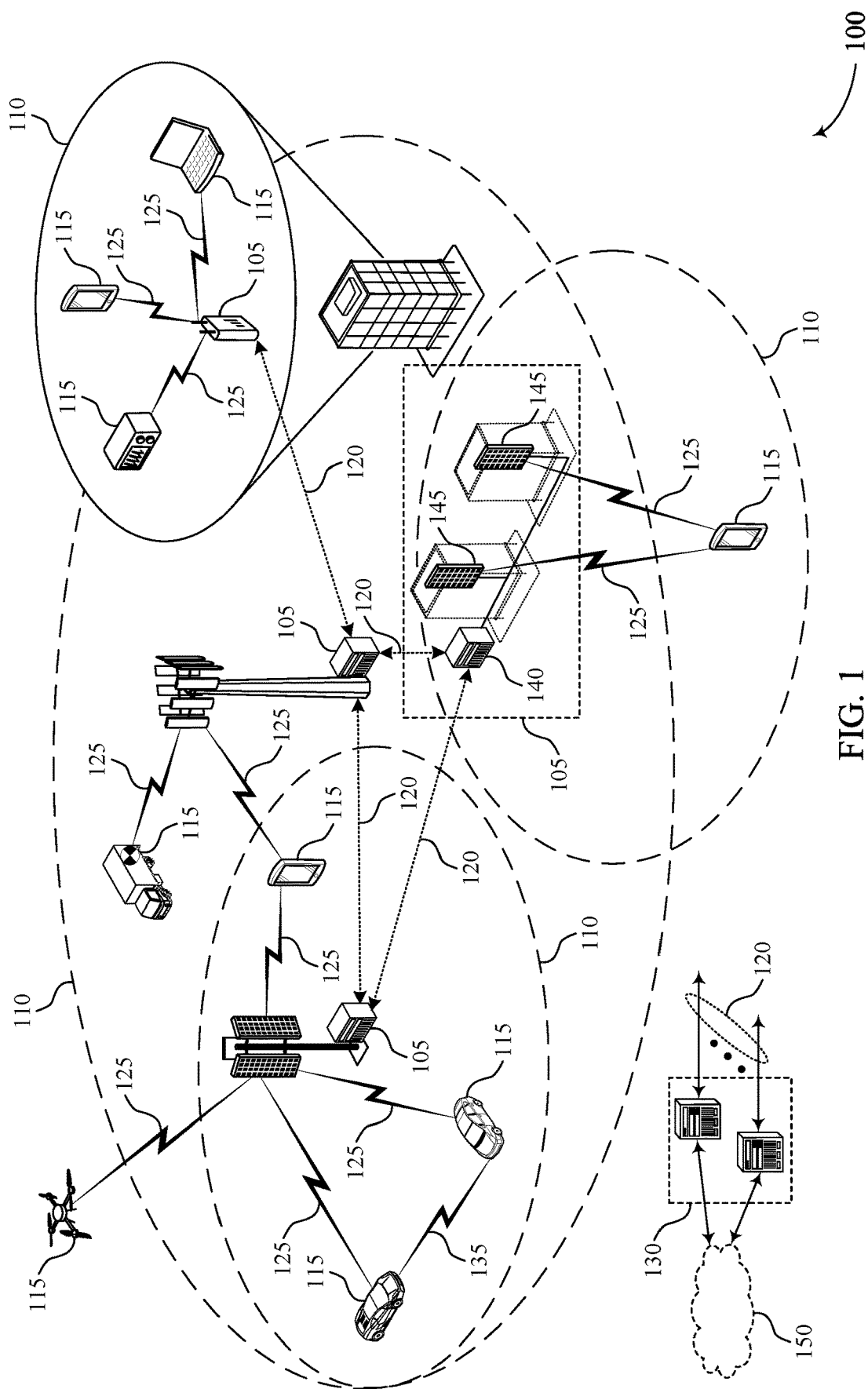
FIG. 1 illustrates an example of a system for wireless communications that supports enhanced user equipment capability exchange during handover in accordance with aspects of the present disclosure.

A user equipment (UE) may communicate with a base station (which may be referred to as a source base station) as part of an active connection on a selected serving cell. In some implementations, however, a UE may experience degraded signal quality or reduced signal power due to signaling interference or mobility within a wireless communications system. Based on the variation in signal quality or signal power, the UE may be handed over from the source base station to different base station (referred to as a target base station) within the wireless communications system. Prior to handover, the UE may transmit a UE capability indicator which may include band information such as a list of bands and band combinations that the UE may be capable of supporting during various handover procedures, for example, during enhanced make before break (eMBB) handover (e.g., also referred to as dual active protocol stack (DAPS) handover)

In some cases during capability signaling, the UE may transmit a capability message. In one example, the UE capability message may indicate one or more band combinations supported by the UE based on carrier aggregation band combinations. In another example, a group identifier may be included in a list of band combinations (e.g., legacy band combinations). In some cases, a given band combination may contain a number of different make before break (MBB) group identifiers, and certain band combinations with the same MBB identifier may be used for the source and target base stations. After transmitting the capability indication to the source base station, the UE may receive a radio resource control (RRC) connection configuration or reconfiguration request from the source base station. In some cases, the RRC connection configuration may indicate a measurement configuration for the UE. The UE may initiate periodic measurement of the active communication on the serving cell, and may transmit an RRC measurement report based on the RRC configuration or reconfiguration request and measurement configuration.

Based on the identified UE capability and measurement reporting, the source base station may determine a source base station configuration for the UE to apply during handover execution, and the source base station may transmit a handover command to initiate a handover procedure to a target base station. In addition, the source base station may transmit the identified UE capability, power sharing information, and measurement reporting to the target base station. In response, the target base station may transmit a target base station configuration to the source base station, which may include a target base station configuration to be used during handover of the UE and/or optionally a target base station configuration to be used after successful handover of the UE. After receiving the target base station configuration, the source base station may transmit an RRC reconfiguration request to the UE which may include the target and source base station configurations for the UE to apply during handover execution. In some examples, the UE may maintain connections with both the source and target base stations using the received configurations (e.g., the UE may maintain a dual connection with both the source and target base stations). The UE may transmit a message to the target base station indicating the successful completion of the handover procedure. In some cases, the UE may end or release a connection with the source base station after establishing a connection with the target base station. After successful handover to the target base station, the UE may release the source connection based on a timer or based on an RRC message received from the target base station for releasing the source base station connection. After releasing the connection with the source base station, the UE may change its configuration to the full target base station configuration.

Aspects of the disclosure are initially described in the context of wireless communications systems. Aspects of the disclosure are further illustrated by and described with reference to apparatus diagrams, system diagrams, and flowcharts that relate to enhanced UE capability during handover.

FIG. 1 illustrates an example of a wireless communications system 100 that supports enhanced user equipment capability exchange during handover in accordance with aspects of the present disclosure. in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband, or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a source base station on a selected serving cell. In some cases, however, a UE 115 may experience degraded signal quality or other challenges to signaling within the serving cell. Based on the variation in signaling quality, the UE 115 may be instructed to handover communications from the source base station 105 to a second, different base station (e.g., a target base station 105) on a different cell within the wireless communications system.

The UE 115 may transmit a UE capability indication which may include capability information including band information, such as a number of bands and/or band combinations that the UE 115 is configured to support. After conveying the capability indication to the source base station 105, the UE 115 may receive an RRC connection configuration or reconfiguration request, and the UE 115 may transmit a measurement report to the source base station. Based on the identified UE capability and measurement reporting, the source base station 105 may transmit a command for a handover procedure to a target base station 105 along with the UE capability and measurement report. The target base station 105 may transmit to the source base station a response to the handover command. The response may include, for example, a first target base station configuration for the UE 115 to apply during handover execution, and a second target base station configuration for the UE 115 to apply after releasing the connection with the source connection.

After receiving the target base station configuration, the source base station 105 may transmit an RRC reconfiguration request to the UE 115 which may include the target and source base station configurations to apply during handover execution, and the target base station configuration to apply after releasing the source base station. In some examples, UE 115 may maintain a connection with the source base station after perform handover execution, and may similarly maintain a connection with the target base station 105 using the received target base station configuration to apply during handover execution. The UE 115 may transmit a message to the target base station 105 indicating the successful completion of the handover procedure. In some cases, for dual active handover, the UE 115 may end or release a connection with source base station 105 after establishing a connection with the target base station 105 (e.g., after the handover is successfully completed) based on a timer or based on an RRC message received from the target base station 105. The UE 115 may apply the target base station configuration after releasing the source base station for subsequent communications with the target base station 105.

Figure 2:
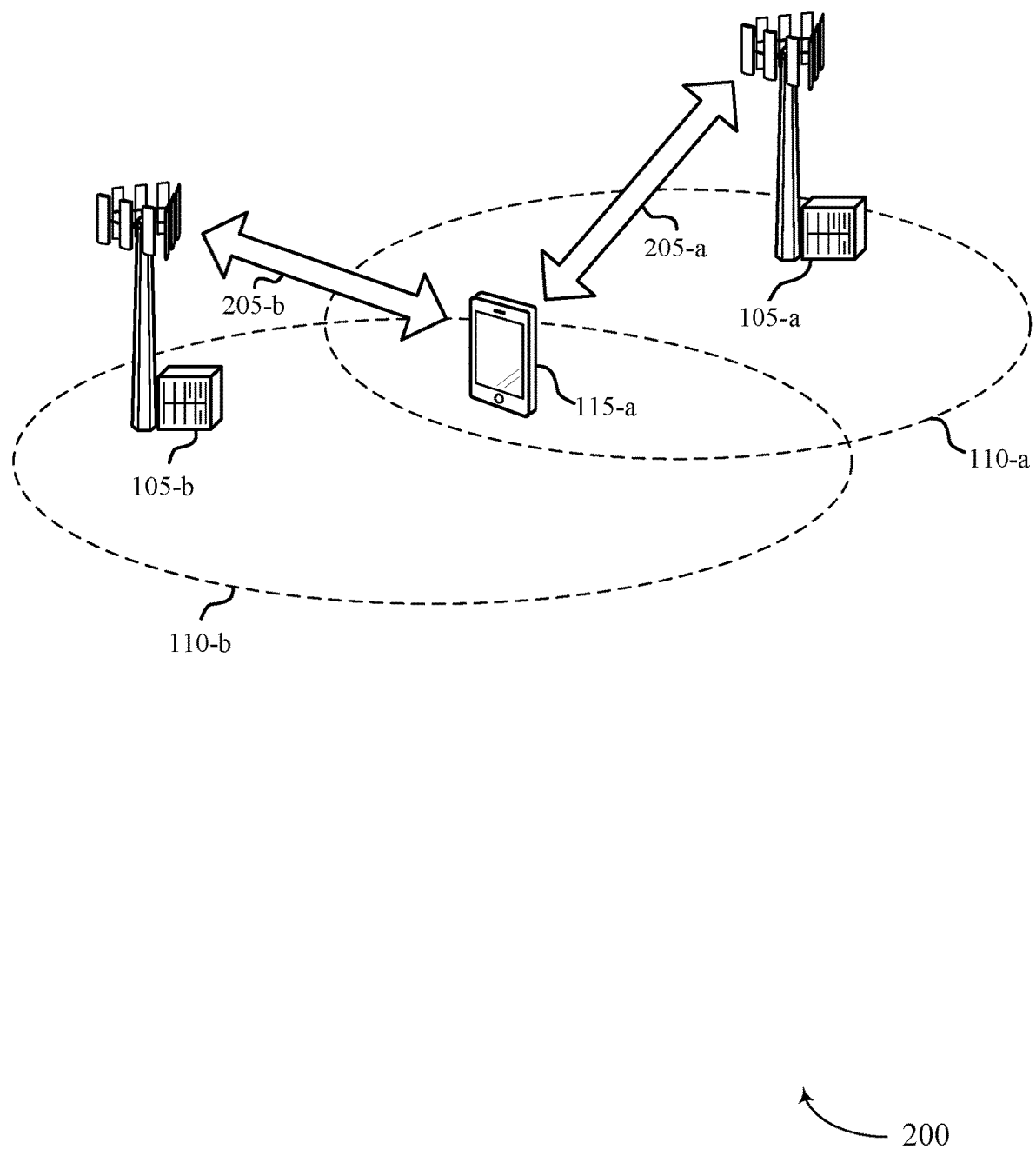
FIG. 2 illustrates an example of a system for wireless communications that supports enhanced user equipment capability exchange during handover in accordance with aspects of the present disclosure.

FIG. 2 illustrates an example of a system for wireless communication 200 that supports enhanced user equipment capability exchange during handover in accordance with aspects of the present disclosure. In some examples, system for wireless communication 200 may implement aspects of wireless communications system 100. For example, the wireless communications system 200 may support various handover procedures from the base station 105-a to the base station 105-b, or vice versa.

The wireless communications system 200 may include a number of base stations, including the set of base stations 105-a and 105-b which may be examples of the corresponding devices described with reference to FIG. 1. The base stations 105-a and 105-b may support various cell deployments in different coverage areas 110-a and 110-b. In some implementations, the coverage areas 110-a and 110-b may overlap in geographic coverage. In some other implementations, the coverage areas 110-a and 110-b may be separated by a geographic distance or interleaved by one or more neighboring coverage areas. The wireless communications system 200 may further include a UE 115-a which may be an example of the corresponding devices described with reference to FIG. 1. In some implementations, the UE 115-a may support enhanced signaling for various handover processes between base stations 105-a and 105-b.

In some implementations, the UE 115-a may experience degraded signal quality or power due to interference or other communication challenges within a supported coverage area 110-a of the serving cell. Additionally or alternatively, mobility at the UE 115-a may experience an increase in signaling attenuation over a communication link 205-a, particularly when operating at a boundary of the coverage area 110-a. The variation in signal quality or signal power may prompt the base station 105-a to initiate a handover process in which both the target and source base stations coordinate to utilize and/or split the one or more band combinations supported by the UE 115-a.

A UE 115-a may be instructed to perform a handover procedure to transfer connectivity from a source base station 105-a to a target base station 105-b. In some cases, the handover procedure may be a dual active protocol stack-based enhanced make before break (eMBB) handover. In such handover procedures, UE 115-a may receive a downlink signal or data packet from the source base station 105-a, and may simultaneously receive a different signal or data packet from the target base station 105-b (e.g., UE 115-a may be capable of simultaneous downlink reception (Rx) of data from both source and target eNB in certain scenarios, e.g., dual Rx). Similarly, UE 115-a may transmit an uplink signal or data packet to the source base station 105-a or the target base station 105-b. In some cases, the UE 115-a may be capable of simultaneous uplink transmission (Tx) to both source and target base stations in certain scenarios (e.g., Dual Tx). Also, The UE 115-a may support certain radio frequency (RF) band combinations based on its transmission chain capability (e.g., UE Tx RF chain capability), and based on whether the UE is intra frequency (synchronous (sync) vs. asynchronous (async)), inter-frequency (intra-band, inter-band, sync vs. async), or the like.

In some cases, simultaneous transmission at UE 115-a may support various RF band combinations, or have a RF transmission chain capability. Additionally, the simultaneous transmission may be based on whether transmissions are intra-frequency (e.g., intra-frequency handover associated with the same frequency band on different cells), or inter-frequency (e.g., inter-frequency handover associated with different frequency bands on different cells). In some cases, the UE 115-a may signal an indication of its capability (e.g., a UE capability message or indicator) to support simultaneous transmission and reception of data from both the source base station 105-a and the target base station 105-b during the eMBB handover procedure. Such UE capability signaling may in some aspects allow for dual connectivity between both base stations during a handover procedure, and may reduce the amount of time the UE 115-a is not connected to a base station during handover. This may improve user experience and reduce undesirable loss of data which may occur during handover processes.

These transmissions may be based on additional parameters, such as whether the transmissions occur intra-band (e.g., via contiguous component carriers within the same operating frequency band), inter-band (e.g., component carriers associated with different operating frequency bands), or whether they are in phase (sync) or out of phase (async) with an associated relay path. In addition, UE 115-*a* may be configured with a number of RF chains for transmission and reception of signals during a handover procedure. For example, a UE 115-*a* may be configured with one or more of dual Rx/dual Tx, dual Rx/single Tx, and single Rx/single Tx RF chains. In certain scenarios (e.g., single Tx, Dual Tx Intra freq async, Dual Tx inter freq-intra band async etc.), if the UE 115-*a* does not support simultaneous transmission to both source and target base stations, the network may provide a TDM pattern for the UE 115-*a*. In some cases, the UE 115-*a* may use the TDM transmission pattern to communicate with the target and source base stations in respective time periods, instead of conducting simultaneous transmission with the source and target base stations.

In some handover procedures, the UE 115-*a* may maintain a single packet data convergence protocol (PDCP) capable of handling dual security keys, dual robust header compression (ROHC) for downlink data reception, single ROHC for single uplink data transmission, common re-ordering, duplicate detection and discard function, in sequence delivery to upper layers, PDCP sequence number (SN) allocation, PDCP re-transmission during handover, and so on.

In addition, UE 115-*a* may operate according to a stack-based configuration. The UE 115-*a* may be configured with a number of stacks (e.g., PHY, MAC, and/or RLC stacks) which may correspond to each of the source base station 105-*a* and the target base station 105-*b* during a handover execution procedure. For example, the UE 115-*a* may have dual PHY/MAC/RLC stacks for each of source and target base stations (e.g., eNBs) during handover execution.

In some cases, handover processes such as those occurring between wireless devices depicted in FIG. 2 (e.g., active stack-based handover) may be subject to a number of challenges. For example, a handover process may have an associated interruption time in the user plane, or a time between the UE 115-*a* ending a connection with the source base station 105-*a* and establishing a connection with the target base station 105-*b*. During such interruption times, data may not be transmitted to or from the UE 115-*a*, resulting in reduced packet throughput and increased data interruption time. As a result, the techniques described herein may reduce the handover interruption time (e.g., to 0 ms or closer to 0 ms), and may enhance connectivity, reduce latency, and increase data throughput.

In some cases, UE 115-*a* may indicate a number of capabilities (e.g., a number of band combinations it may support) to the source base station 105-*a* via communication link 205-*a*. In some cases, the capabilities of the UE 115-*a* may be shared or split between the source and target base stations during the handover procedure. The target and source base stations may in some cases coordinate sharing or splitting of UE capabilities using the techniques described herein. For a UE capable of dual active protocol stack based handover, in order to support simultaneous transmission and reception of data during handover, UE capability may be shared between both source and target base stations to maintain connectivity with each of the source and target base stations. The following discusses signaling enhancements about how to split UE capability between source and target base stations during a handover execution period and how source and target base stations coordinate UE capability sharing.

Figure 3:
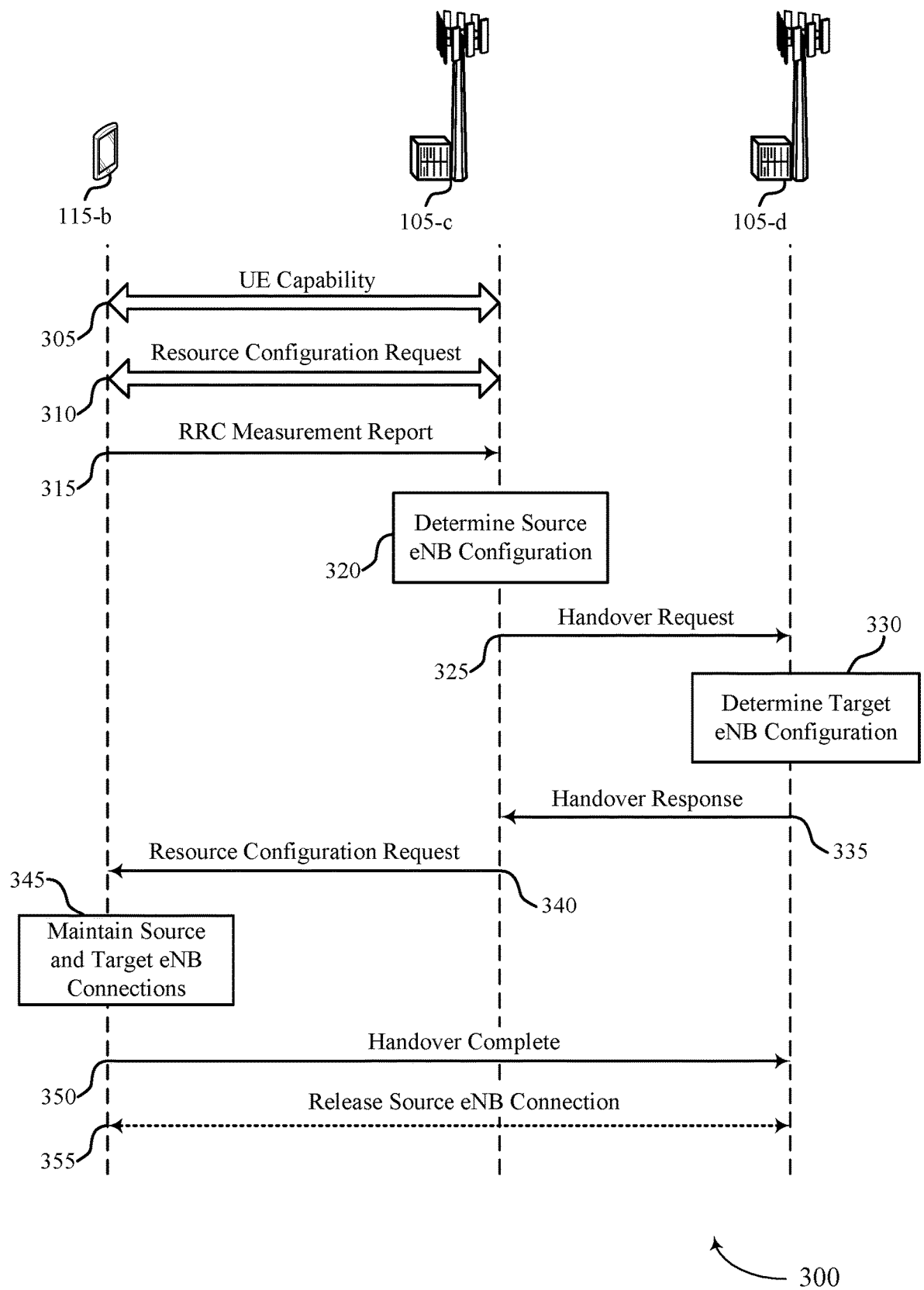
FIG. 3 illustrates an example of a process flow that supports enhanced user equipment capability exchange during handover in accordance with aspects of the present disclosure.

FIG. 3 illustrates an example of a flow diagram 300 that supports enhanced user equipment capability exchange during enhanced make before break handover in accordance with aspects of the present disclosure. In some examples, flow diagram 300 may implement aspects of wireless communications system 100. In some examples, flow diagram 300 may implement aspects of wireless communications system 100. The process flow 300 may include a UE 115-*b* and a set of base stations 105-*c* and 105-*d* which may be examples of corresponding devices described with reference to FIGS. 1 and 2. In some implementations, the base station 105-*c* may correspond to a source base station in communication with the UE 115-*b*, and the base station 105-*d* may correspond to a target base station for handover. The process flow 300 may include aspects of simultaneous transmission and reception by the UE 115-*b*, as well as various capability transmission aspects. Alternative examples of the following may be implemented, where some steps may be performed in a different order than described or not performed at all. In some implementations, steps may include additional features not mentioned below, or further steps may be added.

Process flow 300 discusses improved signaling for handing over a UE from a source base station to a target base station based on one or more band combinations supported by the UE. In some aspects, the source and target base stations may coordinate communication with the UE during and after handover execution using the one or more band combinations supported by the UE.

At 305, the UE 115-*b* may transmit, and the source base station 105-*c* may receive, a UE capability, which may be for example, UE capability information. In some cases, the source base station 105-*c* may transmit a capability inquiry to the UE 115-*b*, and the UE 115-*b* may reply with, for example, capability signaling that includes a band combination indicator indicating at least one band combination supported by UE 115-*b*. The UE capability may in some examples contain band information, such as a list of bands and band combinations that the UE 115-*b* may support. The band combinations contained in the UE capability may in some aspects support carrier aggregation processes for the UE 115-*b*. In some cases, the UE 115-*b* may signal or indicate to the set of base stations which band combination or band combinations are supported for eMBB handover processes. The UE 115-*b* may be configured in a radio resource control connected state.

In some cases, the UE 115-*b* may signal a list of one or more bands or one or more band combinations that the UE 115-*b* supports, and, in some instances, these band combinations may be for carrier aggregation (CA) support. The following discusses techniques that may be used to signal that a given one of those bands or band combinations is supported for eMBB.

In a first example, the capability signaling may include a band combination indicator that indicates one of the existing band combinations from the list (e.g., band combination that UE 115-*b* supports for CA) the UE 115-*b* supports for handover (e.g., eMBB handover). In such cases, the UE 115-*b* may utilize the following signaling to indicate which band combination from a set of band combinations the UE supports for eMBB handover. In these cases, various baseband parameters may be derived from a previously-signaled band combination. For example, the UE 115-*b* may set the parameter EMBB-supported BOOLEAN to indicate if the UE 115 supports an eMBB handover for an existing band combination, and that one or more baseband parameters (e.g., BandCombinationParameters) may be derived from a previously signaled band combination (e.g., used by the UE 115-*b* and the source base station 105-*c* for the connection being handed over to the target base station 105-*d*).

```
SupportedBandCombination-v16xx ::= SEQUENCE
(SIZE(1..maxBandComb-r10)) OF BandCombinationParameters-
v16xx
    BandCombinationParameters-v16xx ::= SEQUENCE{
        eMBB-supported BOOLEAN}
```

In some cases, the UE 115-*b* may support the same baseband capabilities for carrier aggregation (CA) and eMBB for a given band combination or a number of band combinations. Alternatively or additionally, the UE 115-*b* may replicate multiple times the same band combination (from a radio frequency (RF) perspective) but with different baseband capabilities in order to modify (e.g., downgrade) the baseband parameters. In some other cases where the UE 115-*b* may signal or indicate an existing band combination or existing band combinations supported using the capability message, the capability message may not differentiate between source and target capabilities. For example, if the UE 115-*b* supports three component carriers in a given band combination, the capability signaling may not specify how the three component carriers are split between the source and target component carrier.

In a second example, the UE 115-*b* may signal a separate list of band combinations that may be supported for eMBB handover, separate from the list the UE 115-*b* signals for CA support.

In a third example, the UE 115-*b* may signal, for the purpose of eMBB handover, a set of band combinations that may have separate (e.g., different) bands for the source base station 105-*c* and the target base station 105-*d*.

In accordance with the third example, within each band combination, UE 115-*b* may signal (e.g., explicitly signal) a sub-band combination that contains the band combination for source and target base stations that can be supported. For example, UE 115-*b* may indicate one or more sub-band combinations that can be supported for a source base station 105-*c* and one or more sub-band combinations that can be supported for a target base station 105-*d*. Such signaling may include, for example:

```
SupportedBandCombinationParametersMBB-r16 ::= SEQUENCE
(SIZE(1..maxBandComb-r13)) OF
BandCombinationParametersMBB-r16
    BandCombinationParametersMBB-r16 ::= SEQUENCE {
        sourceBandCombination   bandCombinationParametersMBB,
        targetBandCombination   bandCombinationParametersMBB
    }
```

In accordance with the third example, one or more band combinations supported by the UE 115-*b* for the source and target base stations 105-*c* and 105-*d* may be interchangeable (e.g., in case where the UE 115-*b* supports (source band combination, target band combination), it may also support the reverse (target band combination, source band combination). Thus, the following simplification may be applied:

```
SupportedBandCombinationParametersMBB-r16 ::= SEQUENCE
(SIZE(1..maxBandComb-r13)) OF
BandCombinationParametersMBB-r16
    BandCombinationParametersMBB-r16 ::= SEQUENCE {
        bandCombinationSourceOrTarget
        bandCombinationParametersMBB,
        bandCombinationTargetOrSource
    bandCombinationParametersMBB
    }
```

In accordance with the third example, if the UE 115-*b* supports one or more band combinations for a source base station (or a target base station), the UE 115-*b* may also support the same one or more band combinations for the target base station (or source base station). For example, a UE 115-*b* may support a first band combination (BC1) for the source and a second band combination (BC2) for the target. Typically, in cases where the UE 115-*b* supports a (BC1, BC2) for (source, target) it may also support BC1 and BC2 alone. Thus, instead of signaling a whole set of band combination parameters again, the capability signaling BandCombinationParametersMBB may be replaced by a pointer to the corresponding band combination. Beneficially, using the pointer may reduce signaling overhead and reduce computational complexity, resulting in improved processor operation. In example, the following parameters may be signaled:

```
SupportedBandCombinationParametersMBB-r16 ::= SEQUENCE
(SIZE(1..maxBandComb-r13)) OF BandCombinationParametersMBB
-r16
    BandCombinationParametersMBB-r16 ::= SEQUENCE {
        bandCombinationSourceOrTarget
            INTEGER(1 ... maxBandComb-r13),
        bandCombinationTargetOrSource
            INTEGER(1 ... maxBandComb-r13)
    }
```

In another example, instead of referencing the normal BC in the "MBB BC", an "MBB group identifier" may be included in the list of legacy band combinations. A given band combination may contain multiple MBB group identifiers, and certain band combinations with the same MBB identifier may be used for the source and target base stations 105-*c* and 105-*d*, respectively. In an example, band combinations with the same MBB identifier can be used for the source and/or target. UE 115-*b* may transmit capability signaling that includes one or more band combination indicators that each include one or more group identifiers. For example, UE 115-*b* may signal BC1{MBB_ID=1,2}, BC2{MBB_ID=2}, BC3{MBB_ID=1}) to indicate that UE 115-*b* may support {BC1, BC3} and {BC1, BC2} for MBB handover.

In another example, the UE 115-*b* may employ additional techniques to signal support for intra-frequency handover for a given band, inter-frequency intra band eMBB handover for intra-band and inter-band combinations, and the like. For example, for each band in a band combination supported by UE 115-*b*, information elements (IEs) may be included in the capability signaling to indicate support for a number different handover types and parameters. For example, the capability signaling may include one or more IEs to may indicate support for one or more of: intra-frequency eMBB handover, inter-frequency intra-band eMBB handover, async eMBB handover support, TDM support, and UE RF chain capabilities (e.g., the number of transmit (Tx) and receive (Rx) RF chains supported), and so on.

In certain cases, the source base station 105-*c*, for example, may indicate to UE 115-*b* to skip reporting band combinations that may be a fallback or a child of other band combinations. For example, if the UE 115-*b* supports a first band combination (B1, B2, B3, B4) that includes a first band (B1), a second band (B2), a third band (B3), and a fourth band (B4), and further supports a second band combination including (B1, B2, B3), the base station 105-*c* may configure the UE 115-*b* to skip reporting the second band combination (because the band combination is included as a subset of the first band combination).

In the case of eMBB handover, certain, and up to all, band combinations may be fallback of other band combinations. For example, a UE 115-*b* may support the band combination (B1, B2, B3, B4) for CA processes, and may support a subset of those bands (B1, B2) for eMBB handover. This may pose challenges for certain examples which reuse the CA band combination, because the band combination for eMBB may not be explicitly reported (because it is a fallback of the CA band combination).

To overcome such issues, the UE 115-*b* may signal support for various fallback or child band combinations that may be used for eMBB handover, even though the base station 105-*c* configured the UE 115-*b* not to report on those fallback or child band combinations.

In a first case, the base station 105-*c* inquires about the UE capability to support one or more band combinations, and the UE 115-*b* may include, at 305, in its capability signaling (e.g., explicitly) one or more eMBB band combinations that are not a fallback of a different eMBB band combination. In a second case, if a particular eMBB band combination is a fallback band combination of a "non-eMBB BC" (e.g., a CA band combination) and is not a fallback of a different "eMBB BC", the UE 115-*a* may include that particular eMBB band combination in a list of supported band combinations indicated in its capability signaling.

In a third case, if a given band combination is a fallback of a different band combination, but is supported as one of the (source, target) band combinations in an "eMBB BC", the UE 115-*a* may include that given band combination in a list of supported band combinations indicated in its capability signaling.

In a fourth case, a given band combination (e.g., "eMBB BC") may increase a capability size of UE 115-*b*. In such cases, the source base station 105-*b* may include (e.g., explicitly) in a capability inquiry transmitted to the UE 115-*b* whether the UE is to report that eMBB BC (e.g., report support for that given band combination whether supporting would exceed a CA limit of the UE 115-*b*).

At 310, UE 115-*b* may communicate with source base station 105-*c* over the established communication link, and receive a RRC connection configuration or reconfiguration request/complete. The UE 115-*b* and the source base station 105-*c* may communicate bidirectionally via the communication link and may utilize one or more frequency carriers for control and data transmissions. For example, the source base station 105-*c* may indicate a measurement configuration to the UE 115-*b*. The measurement configuration may include specified resources (such as one or more bands and band combinations) and reporting configurations (such as measurement events) for periodic measurement reporting by the UE 115-*b*. In some implementations, the UE 115-*b* may initiate periodic measurement of the active communication on the serving cell, as well as identified signaling corresponding to one or more additional or alternative base stations 105 (e.g., base station 105-*d*) providing communication coverage for one or more neighboring cells. In some cases, the UE 115-*b* may measure reference signals from the source base station 105-*c* and the target base station 105-*d*, along with other neighboring base stations on the supported one or more band combinations. In such cases, the source base station 105-*c* may use information from the measured reference signals to identify the target base station 105-*d*, and may further use the information to determine whether the UE 115-*b* may be handed over to the target base station 105-*d*.

At 315, the UE 115-*b* may transmit, and the source base station 105-*c* may receive, an RRC measurement report based on the RRC configuration or reconfiguration request and measurement configuration. In some examples, the UE 115-*b* may transmit capability signaling to the source base station 105-*c* indicating a capability to support eMBB handover. At some time, the UE 115-*b* may experience degraded signal quality or power due to interference within a serving cell, or mobility of the UE 115-*b* may increase signaling attenuation over a communication link particularly when operating at a boundary of a serving cell. The variation in signal quality or signal power may correspond to a measurement event and may prompt the UE 115-*b* to transmit measurement reporting to the source base station 105-*c*.

At 320, the source base station 105-*c* may determine a new source base station configuration for the UE 115-*b* based on the identified UE capability. The source base station configuration may in some cases be based on the current source base station configuration for the UE 115-*b*. The source base station 105-*c* may determine the new source base station configuration based on which one or more band combinations are supported by the UE 115-*b*, and how one or more bands or band combinations may be allocated/split between the source base station 105-*c* and the target base station 105-*d*. In some cases, the dual connectivity is maintained between each of the source and the target base stations 105-*c* and 105-*d* and the UE 115-*b* during handover execution, and is maintained after handover execution until the communication with the source bases station 105-*c* is released.

At 325, based on the measurement report, the source base station 105-*c* may identify one or more neighboring base stations and may transmit a handover request to a target base station 105-*d*. The handover request may include information for RRC connection re-configuration, as well as identifier information for the target base station 105-*d*. The handover request transmitted to the target base station 105-*d* may further include the received UE capability message, and the new source base station configuration for UE 115-*b*, dual active stack handover indication, asynchronous parameters, TDM pattern(s), power splitting, or the like.

At 330, the target base station 105-*d* may receive the handover request and the UE capability information and may determine a first target base station configuration for the UE 115-*b* to apply during handover execution. In addition, in cases where the source base station 105-*c* is released from communicating with the UE 115-*b* after handover, the target base station 105-*d* may determine a second target base station configuration for the UE 115-*b* to apply after release of a connection with source base station 105-*c*. In some cases, the first and second target base station configurations may be based on the source base station configuration and the indicated UE capability (e.g., max UE capability, one or more supported band combination, etc.).

At 335, the target base station 105-*d* may transmit, to the source base station 105-*c*, a response to the handover request (e.g., a handover request acknowledgement (ACK)). In addition, the target base station 105-*d* may transmit the first target base station configuration for the UE 115-*b* to apply during handover execution. In some cases, a second target base station configuration may be transmitted that contains configuration information to be used in examples where the source base station 105-*c* is released from communications at the UE 115-*b*. The target base station configuration may further include other information, such as a TDM pattern and power sharing information. The TDM pattern may indicate respective time periods in which the source and target base stations respectively transmits with the UE 115-*b* for dual connectivity. In some examples, power sharing information may be used by the UE 115-*b* to determine how the UE 115-*b* can share its transmit power between a source cell associated with source base station 105-*c* and a target cell associated with the target base station 105-*d* during a handover execution period.

At 340, the source base station 105-*c* may transmit an RRC reconfiguration request to the UE 115-*b* to initiate handover of the UE 115-*b* from the source base station 105-*c* to the target base station 105-*d*. In some cases, the RRC reconfiguration request may include mobility control information. Such information may include the target base station configuration to apply during handover execution and the source base station configuration during handover execution to apply during handover execution. In addition, the RRC reconfiguration request may include the target base station configuration for cases where the source base station 105-*c* is released from communication with the UE 115-*b* after handover execution. The RRC reconfiguration request may also include other information, such as TDM pattern(s), asynchronous operation information, power splitting parameters, and so on.

In some cases, the base stations or network may not support UE capability coordination. At 340, UE 115-*b* may receive the RRC reconfiguration message from the source base station 105-*c*, and in some cases, the RRC reconfigurations may indicate that the either the source base station 105-*c*, the target base station 105-*d*, or both are not configured to split UE capabilities.

In one example, the UE 115-*b* may maintain a connection with a primary cell associated with the source base station 105-*c* during and/or after handover execution. The UE 115-*b* in such examples may then release up to all secondary cells associated with the source base station 105-*d*. Alternatively or additionally, the UE 115-*b* may maintain the secondary cells associated with the source base station 105-*d* in a deactivated state during and/or after handover execution. In some cases, the UE 115-*b* may support downlink transmission mode 2 (TM2) transmission diversity after handover execution. In some cases, UE 115-*b* may support TM3, TM4, TM9 and the like, for two layer downlink MIMO or transmission diversity after handover execution. In some cases, the UE 115-*b* may not support uplink MIMO with the source base station 105-*c* after handover execution. In addition, the UE 115-*b* may operate in a TDM manner based on a TDM pattern configured by the source base station 105-*c*.

In another example, the target base station connection may be established for the primary cell (PCell) and optionally one or more secondary cells (SCells) may be established based on the received target base station configuration for the target base station 105-*d*.

Upon receiving a RRC connection reconfiguration message from a source base station 105-*c* (without capability split), the UE 115-*b* may configure PCells and SCells associated with the source and target base stations in accordance with the UE capabilities. In some examples, the combined number of PCells and SCells to be established for the source and target base stations in accordance with the received source and target base station configurations of the source cell and the target cell may be less than that of a UE capability, the capability associated with CA and MIMO, and/or other aspects. If the source cell+target cell combined configuration satisfies (e.g., is less than) the UE max capability of CA, MIMO capability, etc., the UE 115-*b* may configure the indicated number of PCells and SCells. In some examples where the combined configuration of the source cell and the target cell exceeds the UE capability (e.g., target cell+source cell combined configuration>UE max capability), the UE 115-*b* may not configure secondary cells associated with the target base station 105-*d* and/or the secondary cells associated with the target base station 105-*d* may be maintained in a deactivated state. Based on control signaling (e.g., explicit RRC signaling, a MAC CE based mechanism, etc.), the target base station 105-*d* may request UE 115-*b* to release source connection and UE 115-*b* may use its full UE capability for the connection established with the target base station 105-*d*.

In some cases, the UE 115-*b* may provide capability signaling that indicates a dual active stack handover support indication per given source and target base station band combination. The capability signaling may indicates UE support for a source and target base station RF band combination, including supported source base station Pcell+SCell(s), target base station PCell+SCell(s), Source base station CA+Target base station CA<UE Max CA capability, or any combination thereof.

In some cases, the UE 115-*b* may communicate with both source and target cells during handover using a same band and/or a same carrier frequency. In some cases, the UE 115-*b* may release or keep source base station SCells in a deactivated state, while the UE 115-*b* may communicate with a target cell using the target cell configuration.

UE capability signaling may be further utilized to indicate an eMBB handover support for inter-band (e.g., inter-frequency) and intra-band (e.g., intra-frequency and inter-frequency) applications. In some examples, the source base station 105-*a* and the target base station 105-*b* may have separate MIMO configurations per band combination (e.g., different number of layers, different FD-MIMO beam formed capabilities, and so on). In addition, band combinations may in some examples be expressed as per band per band combination, per band combinations, band per band combination per transmission mode (TM), and so on.

In some cases, UE 115-*a* may transmit a capability indication to the source base station 105-*a*. The indication may in some examples include a band combination indicator that indicates one or more band combinations supported by the UE 115-*a*. The source and target base stations 105-*a* and 105-*b* support various configurations (e.g., dual active stack handover support indication per given source and target base station band combination). In some examples, source and target base station RF band combinations may include support for source base station Pcell and Scell(s) and target base station Pcell and Scell(s). In addition, the UE 115-*a* may confirm that source base station CA and target base station CA may be less than the UE max CA capabilities (e.g., Source base station CA+Target base station CA<UE Max CA capability).

In some cases, UE 115-*a* may indicate in its capability signaling a UE capability to support Dual Active Stack handover in async mode per given source and target base station band combination. The capability signaling may also indicate UE capability to support Dual Rx/Dual Tx, Dual Rx/Single Tx, Single Rx/Single Tx RF chain capability for given source and target base station band combination. In some cases, the UE capability may indicate a TDM condition to enable transmission sharing between source and target base stations, and may be applicable for both single Tx and dual Tx UEs.

In another example, the target base station 105-d may request that UE 115-b releases its connection with source base station 105-c such that the UE 115-b may use full UE capability for a subsequent connection with the target base station 105-c.

At 345, the UE 115-b may maintain a connection with the source base station 105-c, and may similarly maintain a connection with the target base station 105-d (e.g., using the received configurations) after receiving the resource configuration request at 340. In addition, active data transfer (e.g., uplink and downlink data transfer from the UE 115-b and the source and target base stations 105-c and 105-d) may take place using a source cell stack associated with the source base station 105-c. In some examples, the UE 115-b may maintain the source base station connection using the source base station configuration received in the resource configuration request, and DL/UL data transfer is active using the source cell stack.

At 350, the UE 115-b may transmit to the target base station 105-d, a message which indicates the completion of the handover procedure. In some cases, the message may be a RRC connection reconfiguration complete message.

At 355, the UE 115-b may in some cases end or release a connection with source base station 105-c. In some examples, the UE 115-b may receive an RRC message from the target base station 105-d containing information to release the connection with the source base station 105-c. In some cases, the RRC message may include the target base station configuration based on a UE capability (e.g., full or max UE capability). In addition, the RRC message may contain information to release established TDM applied during dual connectivity. In some examples, the UE 115-b may receive a MAC control element (CE) from the target base station 105-d indicating to release the connection with the source base station 105-c. After releasing the connection with the source base station 105-c, the UE 115-b may change its configuration to the full target base station configuration, and may release use the TDM pattern applied during dual connectivity.

In some examples, the release of the connection at the source base station 105-c after handover may be timer-based (e.g., timer based source base station release).

Figure 4:
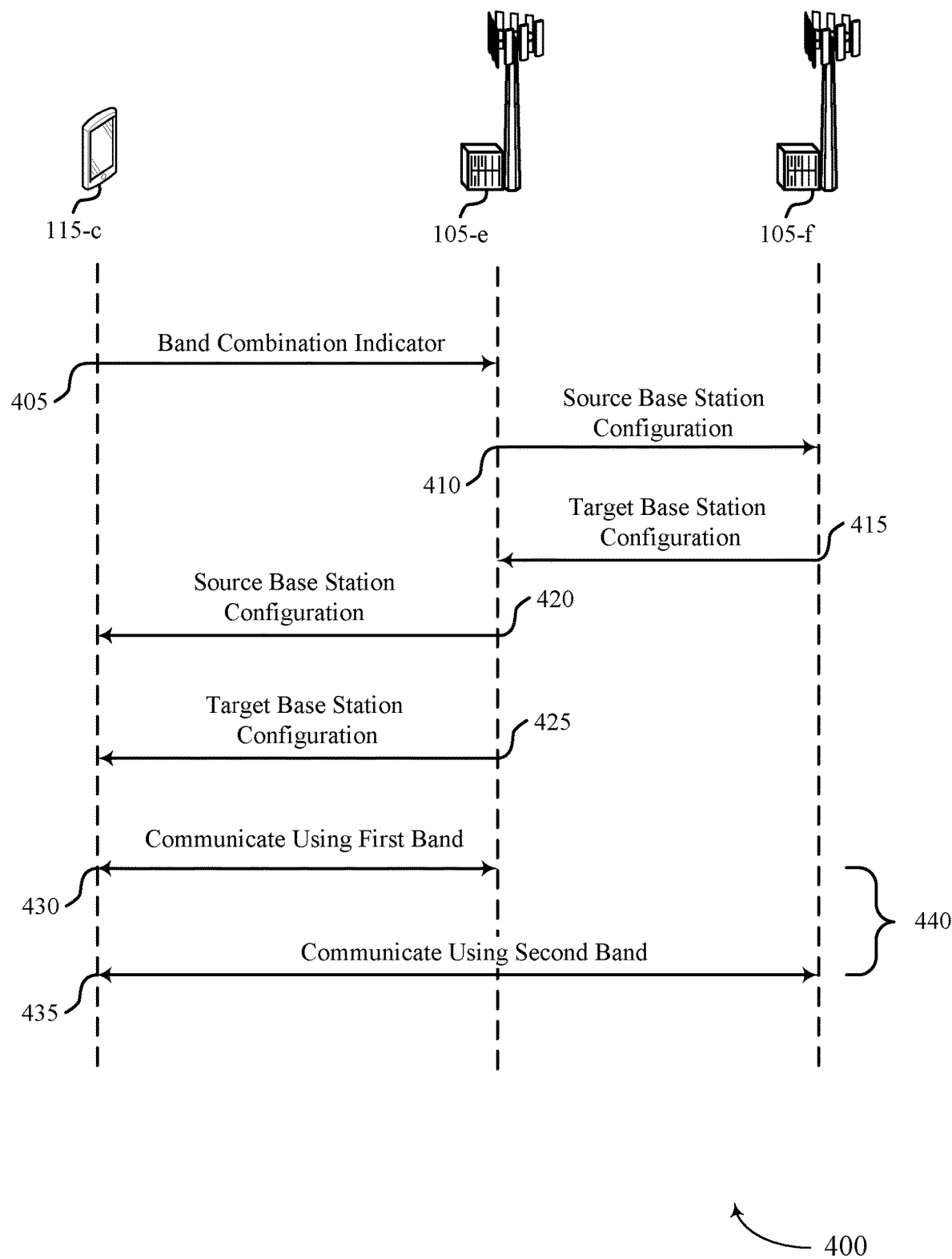
FIG. 4 illustrates an example of a process flow that supports enhanced user equipment capability exchange during handover in accordance with aspects of the present disclosure.

FIG. 4 illustrates an example of a flow diagram 400 that supports enhanced user equipment capability exchange during handover in accordance with aspects of the present disclosure. In some examples, flow diagram 400 may implement aspects of wireless communications system 100. The process flow 400 may include a UE 115-c and a set of base stations 105-e and 105-f which may be examples of corresponding devices described with reference to FIGS. 1-3. In some implementations, the base station 105-e may correspond to a source base station in communication with the UE 115-c, and the base station 105-f may correspond to a target base station for handover. The process flow 400 may include aspects of simultaneous transmission and reception by the UE 115-c, as well as various capability transmission aspects. Alternative examples of the following may be implemented, where some steps may be performed in a different order than described or not performed at all. In some implementations, steps may include additional features not mentioned below, or further steps may be added.

At 405, the UE 115-c may transmit, to source base station 105-e, a band combination indicator that indicates at least one band combination supported by the UE 115-c. In some cases, transmitting the band combination indicator may indicate a single band combination supporting handover or a number of band combinations from a number of different band combinations supported by the UE 115-c for carrier aggregation. In other cases, transmitting the band combination indicator may indicate a first set of one or more band combinations supported by UE 115-c for the source base station 105-e, and a second, different set of one or more band combinations supported by the UE 115-c for the target base station 105-f. In some cases, transmitting the band combination indicator may indicate a number of band combinations that are interchangeably supported by the UE 115-c for the source base station 105-e and the target base station 105-f. In some cases, the UE 115-c may transmit the indicator in addition to a pointer to indicate that one or more of a first band combination, a second band combination, or both, are individually supported by the UE 115-c. In some cases, the band combination indicator may include a group identifier to indicate a first band combination that is interchangeably supported by the UE 115-c for the source base station and the target base station.

Base station 105-e may receive the band combination indicator which indicates the at least one band combination supported by UE 115-c. In some cases, the band combination indicator may indicate a single band combination supporting handover from a number of different band combinations that is supported by the UE 115-c for carrier aggregation, a number of different band combinations supported by the UE 115-c, or number of band combinations that are interchangeably supported by the UE 115-c for the source base station 105-a and a target base station 105-b for carrier aggregation. In some cases, the band combination indicator may indicate a first set of one or more band combinations supported by the UE 115-c for the source base station 105-a and a second, different set of one or more band combinations supported by the UE 115-c for a target base station 105-b.

In some cases, the band combination indicator may include at least one control message to indicate one or more of intra-frequency handover support for a given band, inter-frequency handover support for intra-band and inter-band combinations, asynchronous handover support, time division multiplexing support, radio frequency chain capability, or any combination thereof. In other cases, the band combination indicator may indicate a first band combination that is not a fallback of a different band combination, or that at least one enhanced make before break (eMBB) band combination is a fallback of a non-eMBB band combination.

In some cases, the UE capability may indicate a means to support a handover procedure (e.g., dual active stack handover) in a number of different modes based on a number of different band combinations. For example, the UE may support handover in async mode per a given source and target base station band combination. In some other cases, the UE capability may indicate a TDM aspect which may enable a sharing of transmission or transmission data between a source and target base station.

At 410, source base station 105-e may transmit, and target base station 105-f may receive, the UE capability and a source base station configuration to be applied during handover execution and at least one band combination supported by UE 115-c, where the source base station configuration may indicate a first band of the at least one band combination. In some cases, the target base station 105-f may receive a TDM pattern from the source base station 105-e.

At 415, the target base station 105-f may transmit, and base station 105-e may receive, a target base station configuration to be applied during handover execution based on the received source base station 105-e configuration and the at least one band combination, where the target base station configuration indicates a second band of the at least one band combination.

In some examples, the source base station 105-e may identify a maximum UE capability associated with the at least one band combination supported by the UE 115-c. In some examples, the source base station 105-e may determine that a combination of the source base station 105-e configuration and the target base station 105-f configuration do not exceed the capabilities of the UE 115-c. In some other examples, the source base station 105-e may determine that a combination of the source base station 105-e configuration and the target base station 105-f configuration exceeds the capabilities of the UE 115-c. Based on determining that the combination of the source base station 105-e configuration and the target base station 105-f configuration exceeds the capabilities of the UE 115-c, the source base station may identify an updated source base station configuration such that the combination of source and target base station configuration do not exceed the maximum capabilities of the UE 115-c.

At 420, the source base station 105-e may transmit, and UE 115-c may receive, source base station configuration (e.g., the source base station configuration or an updated source base station configuration) to apply during handover execution based on the band combination indicator. In some cases, the source base station 105-e may additionally or alternatively transmit a handover instruction or a TDM multiplexing pattern or a connection reconfiguration message to the UE 115-c.

At 425, the source base station 105-e may transmit, and UE 115-c may receive, target base station configuration to apply during handover execution based on the band combination indicator.

At 430, the UE 115-c may communicate with the source base station 105-e during and/or after handover execution period 440 using a first band of the at least one band combination indicated in the source base station configuration.

In some cases, the UE 115-c may release connection with the source base station 105-e, and may communicate with the target base station 105-f based on the received target base station configuration after releasing communications with the source base station 105-e.

At 435, the UE 115-c may communicate with target base station 105-f during and/or after handover execution period 440 using a second band of the at least one band combination indicated in the target base station configuration. In some cases, the first and second bands may be different, may partially overlap, or may be the same.

Figure 5:
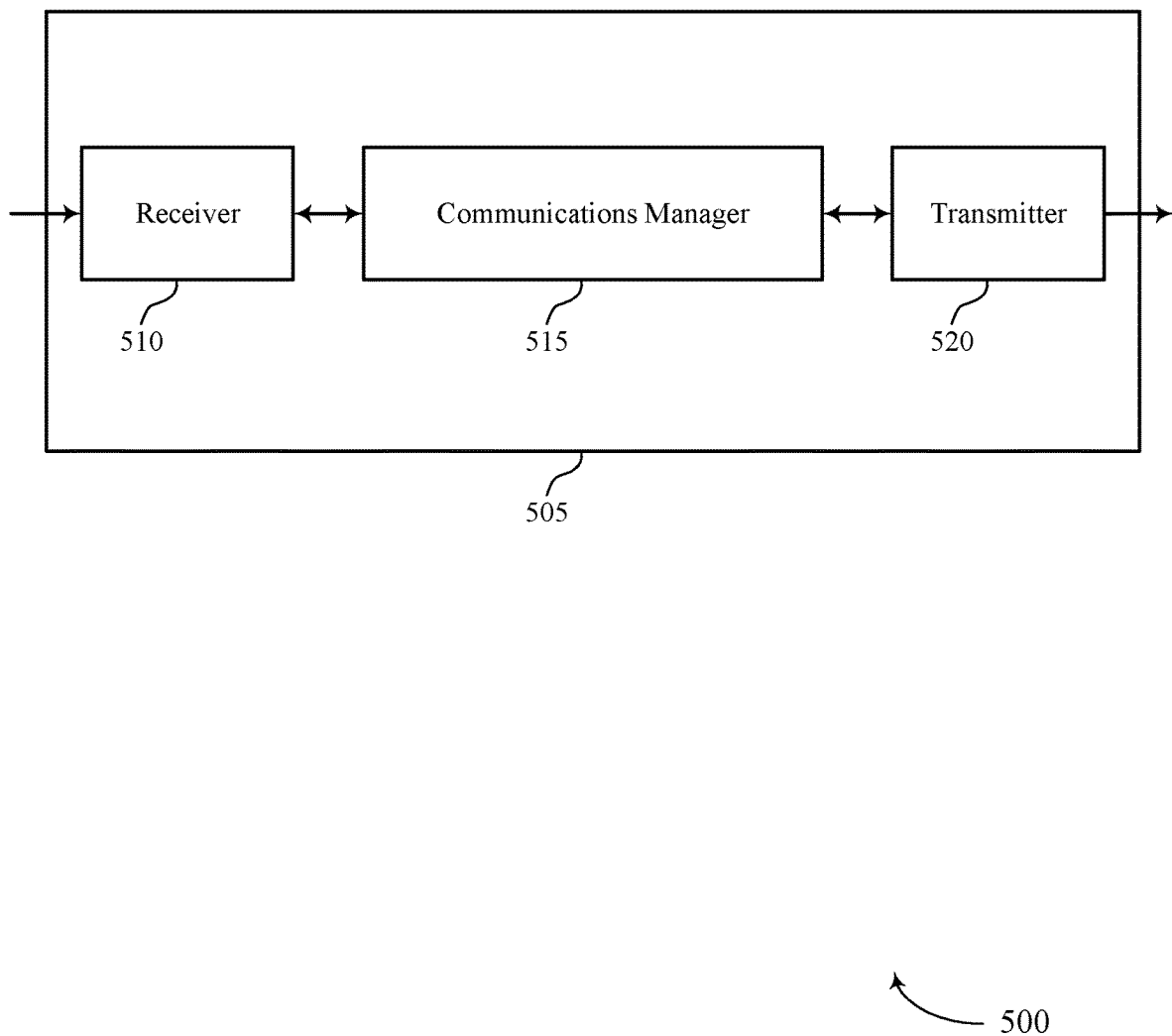
FIGS. 5 and 6 show block diagrams of devices that support enhanced user equipment capability exchange during handover in accordance with aspects of the present disclosure.

FIG. 5 shows a block diagram 500 of a device 505 that supports enhanced user equipment capability exchange during handover in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to enhanced user equipment capability-based handover, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a source base station, a band combination indicator that indicates at least one band combination supported by the UE, receive, in response to transmitting the band combination indicator, a target base station configuration to apply during handover execution and a source base station configuration to apply during handover execution, communicate with the source base station during handover execution using a first band of the at least one band combination indicated in the source base station configuration, and communicate with a target base station during handover execution using a second band of the at least one band combination indicated in the target base station configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
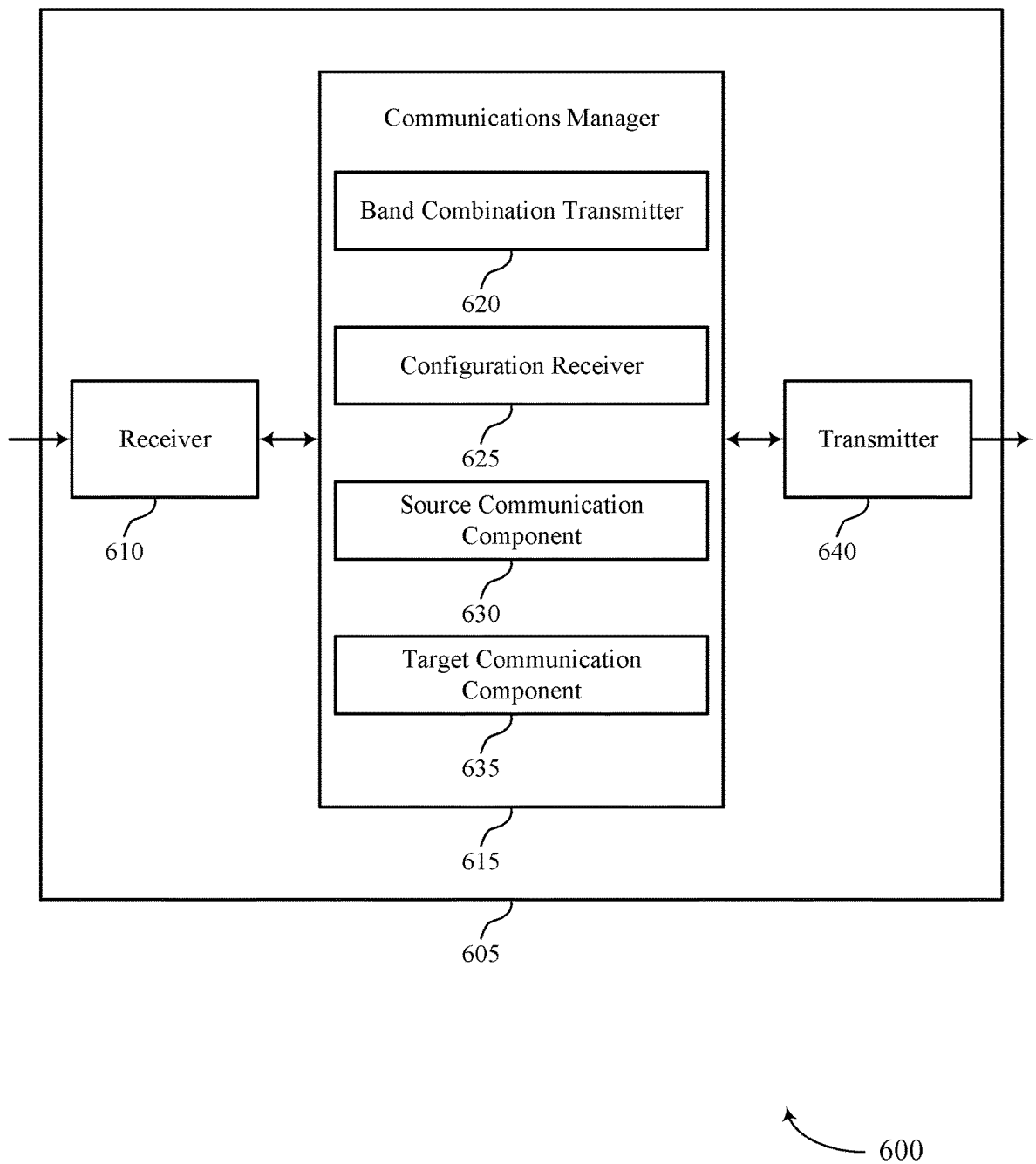

FIG. 6 shows a block diagram 600 of a device 605 that supports enhanced user equipment capability exchange during handover in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to enhanced user equipment capability exchange during handover, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a band combination transmitter 620, a configuration receiver 625, a source communication component 630, and a target communication component 635. The communications manager 615 may be an example of aspects of the communications manager 810 described herein.

The band combination transmitter 620 may transmit, to a source base station, a band combination indicator that indicates at least one band combination supported by the UE.

The configuration receiver 625 may receive, in response to transmitting the band combination indicator, a target base station configuration to apply during handover execution and a source base station configuration to apply during handover execution.

The source communication component 630 may communicate with the source base station during handover execution using a first band of the at least one band combination indicated in the source base station configuration.

The target communication component 635 may communicate with a target base station during handover execution using a second band of the at least one band combination indicated in the target base station configuration.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

In some examples, communications manager 615 may be implemented as an integrated circuit or chipset for a mobile device modem, and the receiver 610 and transmitter 620 and 640 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may enable a UE to allocate capabilities between a source base station with which the UE is currently connected, and a target base station that it may establish a connection with via a handover process. At least one implementation may enable the UE to support multiple bands for connections between the source and target base station. In some implementations, the UE may support capability signaling to indicate support for eMBB handover processes.

Based on implementing the handover techniques as described herein, one or more processors of the device 605 (e.g., processor(s) controlling or incorporated with one or more of receiver 610, communications manager 615, and transmitters 620 and 640) may increase the communications reliability and reduce connectivity challenges that may be associated with handover. In some examples, the UE may reduce service loss based on performing handover between base stations.

Figure 7:
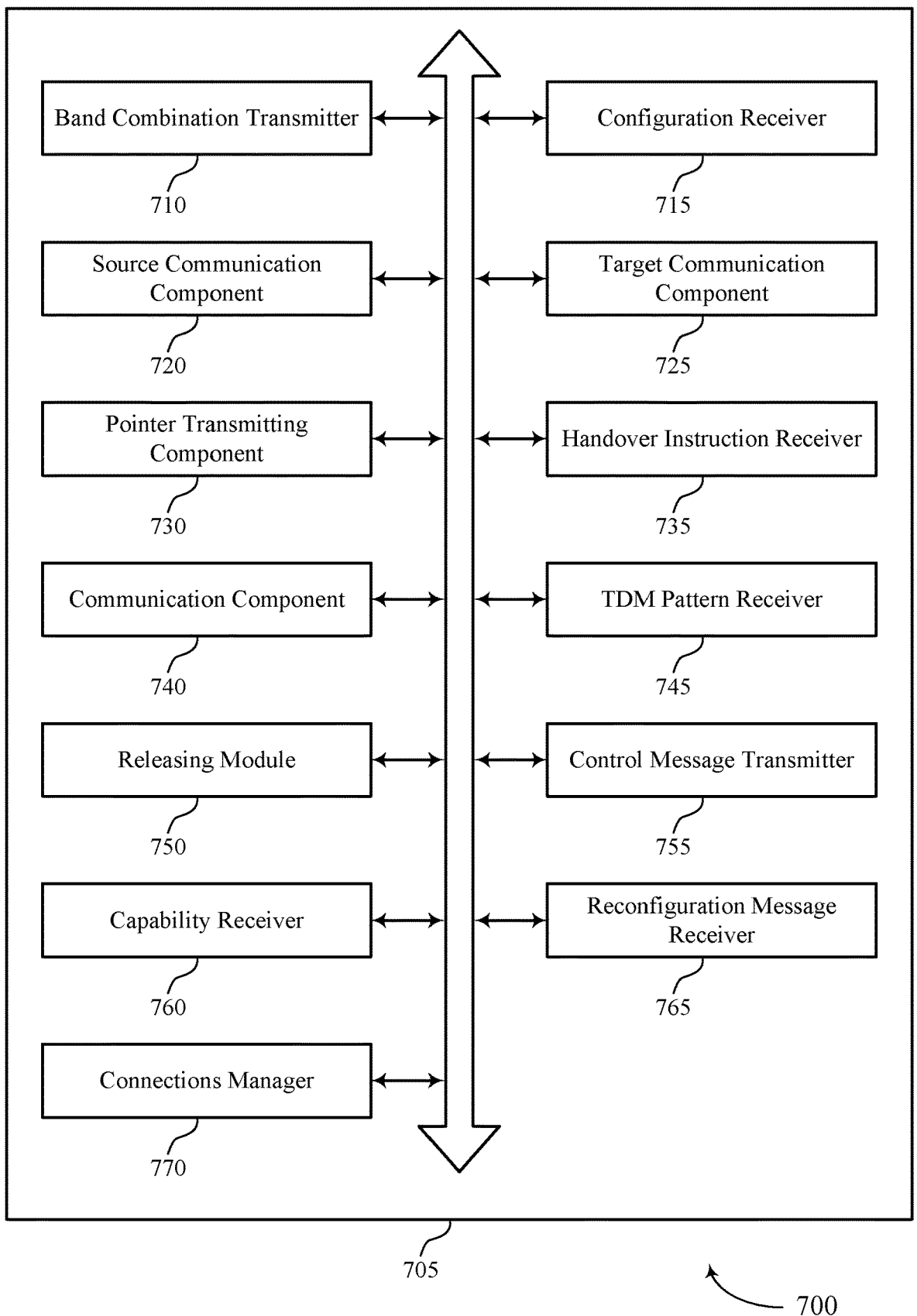
FIG. 7 shows a block diagram of a communications manager that supports enhanced user equipment capability exchange during handover in accordance with aspects of the present disclosure.

FIG. 7 shows a block diagram 700 of a communications manager 705 that supports enhanced user equipment capability exchange during handover in accordance with aspects of the present disclosure. The communications manager 705 may be an example of aspects of a communications manager 515, a communications manager 615, or a communications manager 810 described herein. The communications manager 705 may include a band combination transmitter 710, a configuration receiver 715, a source communication component 720, a target communication component 725, a pointer transmitting component 730, a handover instruction receiver 735, a communication component 740, a TDM pattern receiver 745, a releasing module 750, a control message transmitter 755, a capability receiver 760, a reconfiguration message receiver 765, and a connections manager 770. Each of these modules may communicate, directly or indirectly, with one another (e.g., via one or more buses).

The band combination transmitter 710 may transmit, to a source base station, a band combination indicator that indicates at least one band combination supported by the UE. In some examples, the band combination transmitter 710 may transmit the band combination indicator to indicate a single band combination supporting handover from a set of different band combinations that is supported by the UE for carrier aggregation. In some examples, the band combination transmitter 710 may transmit the band combination indicator to indicate a set of different band combinations supported by the UE for carrier aggregation.

In some examples, the band combination transmitter 710 may transmit the band combination indicator to indicate a first set of one or more band combinations supported by the UE for the source base station and a second set of one or more band combinations supported by the UE for the target base station.

In some examples, the band combination transmitter 710 may transmit the band combination indicator to indicate a set of band combinations that are interchangeably supported by the UE for the source base station and the target base station.

In some examples, the band combination transmitter 710 may transmit the band combination indicator to indicate a first band combination supported by the UE for the source base station and a second band combination supported by the UE for the target base station.

In some examples, transmitting the band combination indicator that includes a group identifier to indicate a first band combination that is interchangeably supported by the UE for the source base station and the target base station.

In some examples, the band combination transmitter 710 may transmit the band combination indicator that indicates a first band combination that is not a fallback of a different band combination.

In some examples, the band combination transmitter 710 may transmit the band combination indicator that indicates at least one enhanced make before break (eMBB) band combination that is a fallback of a non-eMBB band combination.

In some examples, the band combination transmitter 710 may transmit the band combination indicator that indicates an enhanced make before break (eMBB) band combination that is a fallback of a different band combination of the at least one band combination.

In some cases, the first set of one or more band combinations is different than the second set of band combinations. In some cases, the first band and the second band are the same, or the first band and the second band are different, or the first band and the second band at least partially overlap.

The configuration receiver 715 may receive, in response to transmitting the band combination indicator, a target base station configuration to apply during handover execution and a source base station configuration to apply during handover execution.

In some examples, the configuration receiver 715 may receive, based on the band combination indicator, a second target base station configuration to apply after releasing a connection with the source base station by the UE.

The source communication component 720 may communicate with the source base station during handover execution using a first band of the at least one band combination indicated in the source base station configuration.

The target communication component 725 may communicate with a target base station during handover execution using a second band of the at least one band combination indicated in the target base station configuration.

In some examples, the target communication component 725 may communicate with the target base station after releasing the connection using the first band, the second band, or both, based on the second target base station configuration.

The pointer transmitting component 730 may transmit a pointer to indicate that one or more of the first band combination, the second band combination, or both, are individually supported by the UE.

The handover instruction receiver 735 may receive a handover instruction to handover the UE from the source base station to the target base station. In some cases, the handover is an enhanced make before break handover.

The communication component 740 may communicate with the source base station after handover execution using the first band and communicating with the target base station after handover execution using the second band. In some examples, the communication component 740 may communicate with the source base station after handover execution using the first band and communicating with the target base station after handover execution using the second band based on the time division multiplexing pattern.

The TDM pattern receiver 745 may receive a time division multiplexing pattern.

The releasing module 750 may release the connection with the source base station. Releasing module 750 may in some cases release the connection based on a timer or based on an RRC message received from the target base station. In some examples, the releasing module 750 may release or deactivating at least one secondary cell connection with the source base station based on the connection reconfiguration message.

The control message transmitter 755 may transmit at least one control message to indicate one or more of intra-frequency handover support for a given band, inter-frequency handover support for intra-band and inter-band combinations, asynchronous handover support, time division multiplexing support, radio frequency chain capability, or any combination thereof. In some cases, the control message is an information element indicated for a band combination supporting enhanced make before break (eMBB) handover.

The capability receiver 760 may receive a capability inquiry, where the band combination indicator is transmitted based on the capability inquiry.

In some examples, the capability receiver 760 may receive the capability inquiry that indicates that an enhanced make before break (eMBB) band combination increases a capability size, where the band combination indicator indicates whether the eMBB band combination is supported.

The reconfiguration message receiver 765 may receive a connection reconfiguration message from the source base station.

The connections manager 770 may maintain a primary cell connection with the source base station based on the connection reconfiguration message. In some examples, the connections manager 770 may establish a primary cell connection with the target base station based on the connection reconfiguration message. In some examples, the connections manager 770 may establish at least one secondary cell connection with the target base station based on the connection reconfiguration message.

In some examples, the connections manager 770 may determine that the connection reconfiguration message instructs the UE to establish a number of connections that exceeds a capability of the UE. In some examples, the connections manager 770 may skip configuring or deactivating at least one secondary cell connection for the target base station to comply with the capability. In some cases, the capability is a carrier aggregation capability, a multiple input multiple output (MIMO) capability of the UE, or both.

Figure 8:
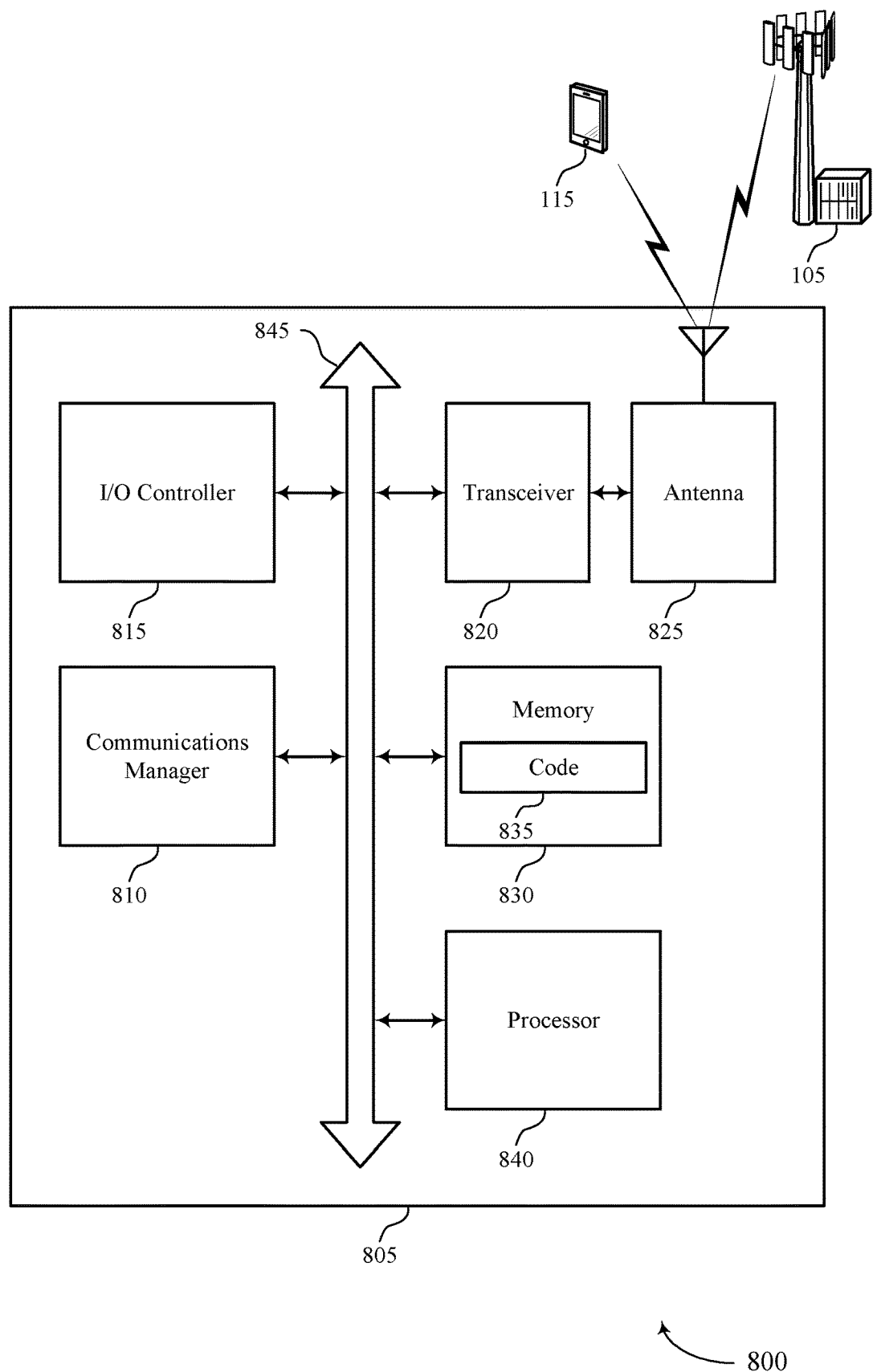
FIG. 8 shows a diagram of a system including a device that supports enhanced user equipment capability exchange during handover in accordance with aspects of the present disclosure.

FIG. 8 shows a diagram of a system 800 including a device 805 that supports enhanced user equipment capability exchange during handover in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a source base station, a band combination indicator that indicates at least one band combination supported by the UE, receive, in response to transmitting the band combination indicator, a target base station configuration to apply during handover execution and a source base station configuration to apply during handover execution, communicate with the source base station during handover execution using a first band of the at least one band combination indicated in the source base station configuration, and communicate with a target base station during handover execution using a second band of the at least one band combination indicated in the target base station configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting enhanced user equipment capability exchange during handover).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
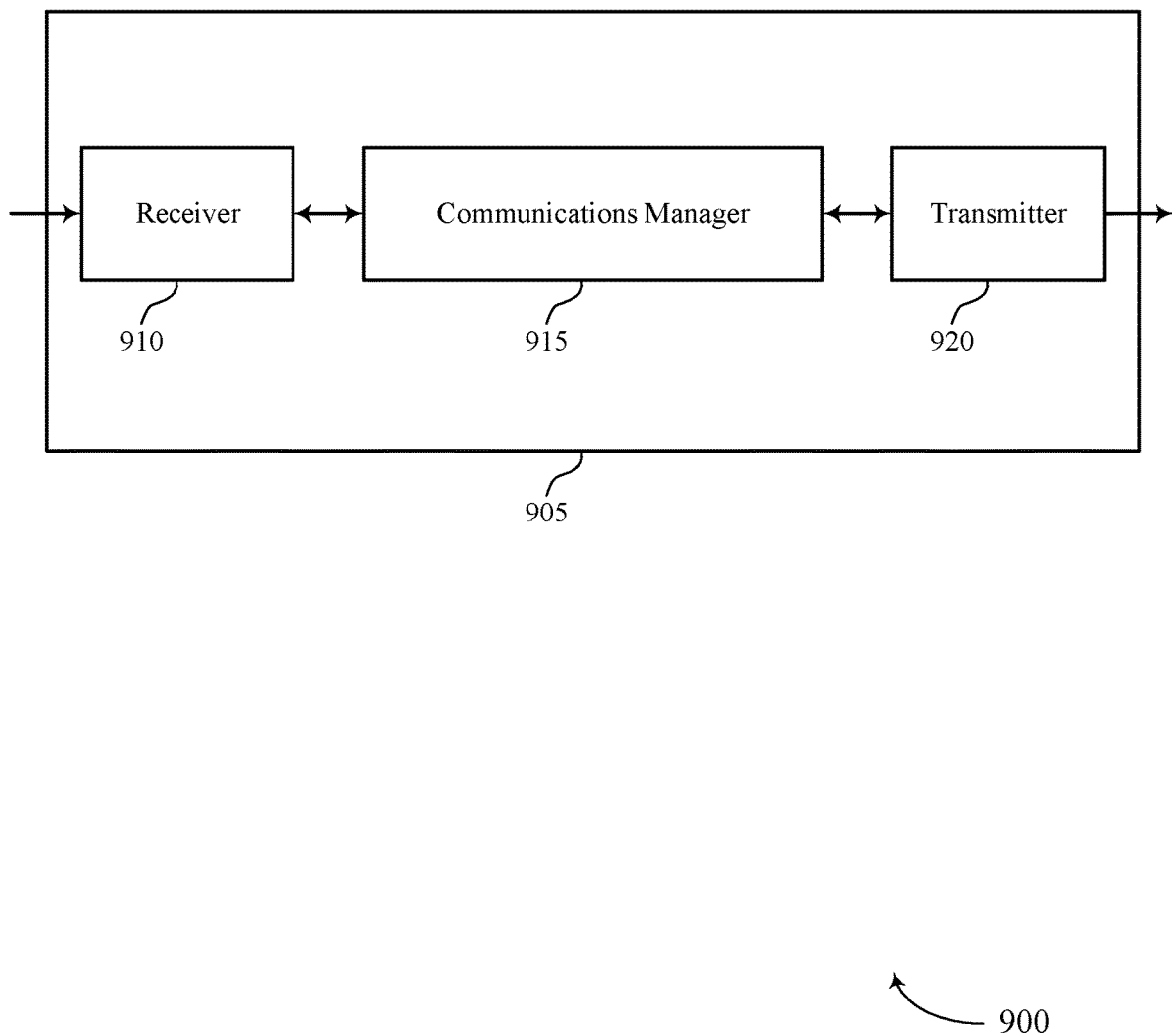
FIGS. 9 and 10 show block diagrams of devices that support enhanced user equipment capability exchange during handover in accordance with aspects of the present disclosure.

FIG. 9 shows a block diagram 900 of a device 905 that supports enhanced user equipment capability exchange during handover in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to enhanced user equipment capability exchange during handover, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a band combination indicator that indicates at least one band combination supported by a UE, transmit, to the UE, a target base station configuration to apply during handover execution and a source base station configuration to apply during handover execution based on the band combination indicator, and communicate with the UE during handover execution using a first band of the at least one band combination indicated in the source base station configuration. The communications manager 915 may also receive, from a source base station, a source base station configuration to be applied during handover execution and at least one band combination supported by a UE, the source base station configuration indicating a first band of the at least one band combination, transmit, to the source base station, a target base station configuration to be applied during handover execution based on the source base station configuration and the at least one band combination, the target base station configuration indicating a second band of the at least one band combination, and communicate with the UE during handover execution using the second band based on the target base station configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
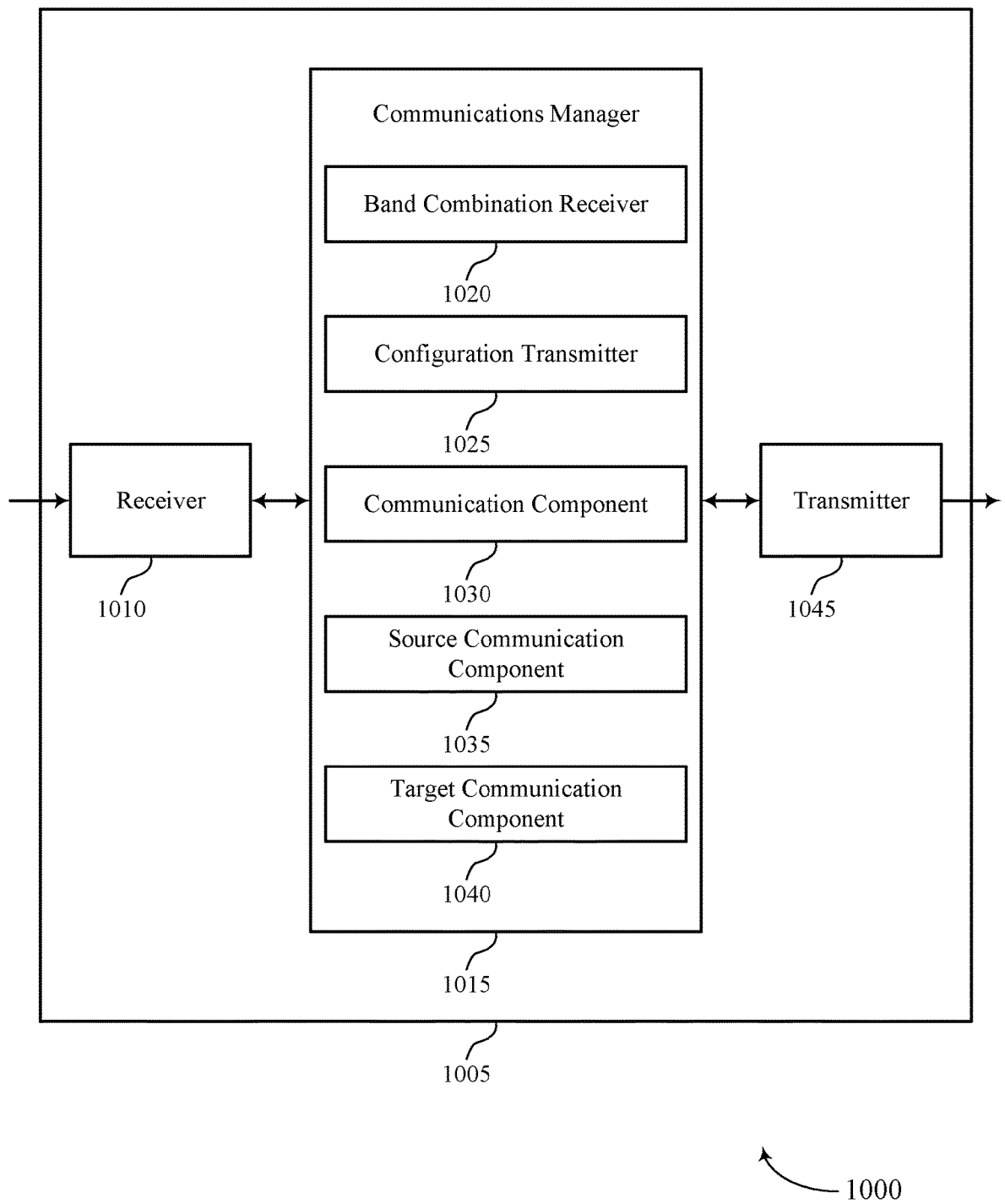

FIG. 10 shows a block diagram 1000 of a device 1005 that supports enhanced user equipment capability exchange during handover in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to enhanced user equipment capability exchange during handover, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a band combination receiver 1020, a configuration transmitter 1025, a communication component 1030, a source communication component 1035, and a target communication component 1040. The communications manager 1015 may be an example of aspects of the communications manager 1210 described herein.

The band combination receiver 1020 may receive a band combination indicator that indicates at least one band combination supported by a UE.

The configuration transmitter 1025 may transmit, to the UE, a target base station configuration to apply during handover execution and a source base station configuration to apply during handover execution based on the band combination indicator.

The communication component 1030 may communicate with the UE during handover execution using a first band of the at least one band combination indicated in the source base station configuration.

The source communication component 1035 may receive, from a source base station, a source base station configuration to be applied during handover execution and at least one band combination supported by a UE, the source base station configuration indicating a first band of the at least one band combination.

The target communication component 1040 may transmit, to the source base station, a target base station configuration to be applied during handover execution based on the source base station configuration and the at least one band combination, the target base station configuration indicating a second band of the at least one band combination.

The communication component 1030 may communicate with the UE during handover execution using the second band based on the target base station configuration.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
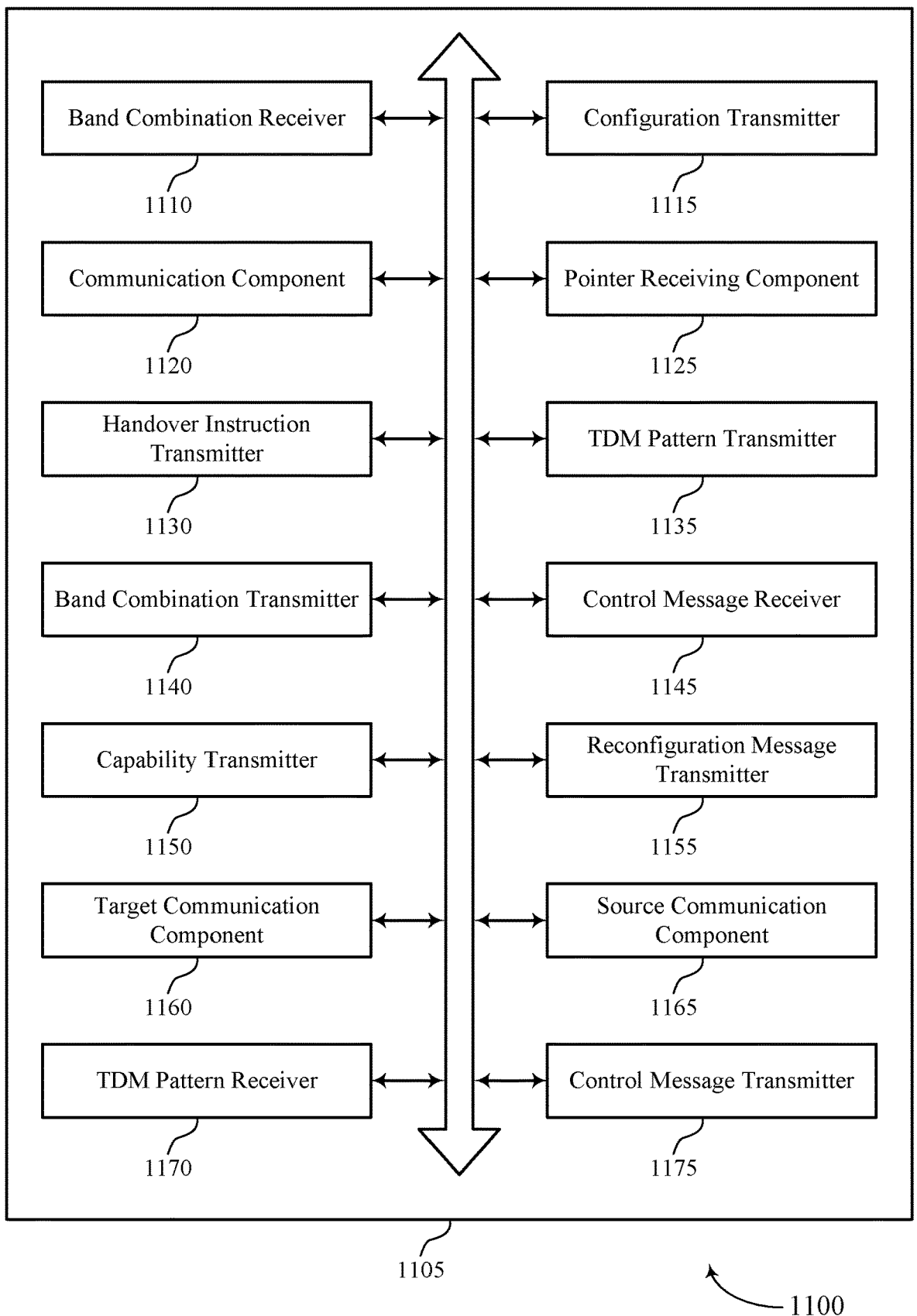
FIG. 11 shows a block diagram of a communications manager that supports enhanced user equipment capability exchange during handover in accordance with aspects of the present disclosure.

FIG. 11 shows a block diagram 1100 of a communications manager 1105 that supports enhanced user equipment capability exchange during handover in accordance with aspects of the present disclosure. The communications manager 1105 may be an example of aspects of a communications manager 915, a communications manager 1015, or a communications manager 1210 described herein. The communications manager 1105 may include a band combination receiver 1110, a configuration transmitter 1115, a communication component 1120, a pointer receiving component 1125, a handover instruction transmitter 1130, a TDM pattern transmitter 1135, a band combination transmitter 1140, a control message receiver 1145, a capability transmitter 1150, a reconfiguration message transmitter 1155, a target communication component 1160, a source communication component 1165, a TDM pattern receiver 1170, and a control message transmitter 1175. Each of these modules may communicate, directly or indirectly, with one another (e.g., via one or more buses).

The band combination receiver 1110 may receive a band combination indicator that indicates at least one band combination supported by a UE.

In some examples, the band combination receiver 1110 may receive the band combination indicator that indicates a single band combination supporting handover from a set of different band combinations that is supported by the UE for carrier aggregation. In some examples, the band combination receiver 1110 may receive the band combination indicator that indicates a set of different band combinations supported by the UE.

In some examples, the band combination receiver 1110 may receive the band combination indicator that indicates a first set of one or more band combinations supported by the UE for the source base station and a second set of one or more band combinations supported by the UE for a target base station.

In some examples, the band combination receiver 1110 may receive the band combination indicator that indicates a set of band combinations that are interchangeably supported by the UE for the source base station and a target base station.

In some examples, the band combination receiver 1110 may receive the band combination indicator that indicates a first band combination supported by the UE for the source base station and a second band combination supported by the UE for a target base station.

In some examples, receiving the band combination indicator that includes a group identifier to indicate a first band combination that is interchangeably supported by the UE for the source base station and a target base station.

In some examples, the band combination receiver 1110 may receive the band combination indicator that indicates a first band combination that is not a fallback of a different band combination.

In some examples, the band combination receiver 1110 may receive the band combination indicator that indicates at least one enhanced make before break (eMBB) band combination that is a fallback of a non-eMBB band combination.

In some examples, the band combination receiver 1110 may receive the band combination indicator that indicates at least one band combination that is a fallback of a different band combination and is a supported band combination in enhanced make before break (eMBB).

In some cases, the first set of one or more band combinations is different than the second set of band combinations.

The configuration transmitter 1115 may transmit, to the UE, a target base station configuration to apply during handover execution and a source base station configuration to apply during handover execution based on the band combination indicator.

The communication component 1120 may communicate with the UE during handover execution using a first band of the at least one band combination indicated in the source base station configuration.

In some examples, the communication component 1120 may communicate with the UE during handover execution using the second band based on the target base station configuration. In some examples, the communication component 1120 may communicate with the UE during and after handover execution using the first band. In some examples, the communication component 1120 may communicate with the UE during and after handover execution using the first band based on the time division multiplexing pattern.

In some examples, the communication component 1120 may communicate with the UE during and after handover execution using the second band. In some examples, the communication component 1120 may communicate with the UE during and after handover execution using the second band based on the time division multiplexing pattern. In some examples, the communication component 1120 may communicate with the UE based on the second target base station configuration.

The target communication component 1160 may transmit, to the source base station, a target base station configuration to be applied during handover execution based on the source base station configuration and the at least one band combination, the target base station configuration indicating a second band of the at least one band combination.

In some examples, the target communication component 1160 may transmit, to the UE, the target base station configuration to apply during handover execution. In some examples, the target communication component 1160 may transmit the target base station configuration to apply during handover execution and a modified source base station configuration to apply during handover execution. In some examples, the target communication component 1160 may transmit, to the UE, a second target base station configuration to apply after handover of the UE and after release of the source base station by the UE.

In some examples, the target communication component 1160 may transmit, to the source base station, a second target base station configuration for the UE to apply after releasing a connection with the source base station.

In some examples, the target communication component 1160 may transmit, to the UE, a target base station configuration to be applied after handover execution and after release of the source base station. In some cases, the first band is the same as, at least partially overlaps with, or is different than a second band of the at least one band combination indicated in the target base station configuration.

In some cases, the first band and the second band are the same, or the first band and the second band are different, or the first band and the second band at least partially overlap.

The source communication component 1165 may receive, from a source base station, a source base station configuration to be applied during handover execution and at least one band combination supported by a UE, the source base station configuration indicating a first band of the at least one band combination.

The pointer receiving component 1125 may receive a pointer to indicate that one or more of the first band combination, the second band combination, or both, are individually supported by the UE.

The handover instruction transmitter 1130 may transmit a handover instruction to the UE. In some cases, the handover is an enhanced make before break handover.

The TDM pattern transmitter 1135 may transmit a time division multiplexing pattern.

The band combination transmitter 1140 may transmit, based on the band combination indicator, a second target base station configuration for the UE to apply after releasing a connection with the source base station.

The control message receiver 1145 may receive at least one control message to indicate one or more of intra-frequency handover support for a given band, inter-frequency handover support for intra-band and inter-band combinations, asynchronous handover support, time division multiplexing support, radio frequency chain capability, or any combination thereof. In some cases, the control message is an information element indicated for a band combination supporting enhanced make before break (eMBB) handover.

The capability transmitter 1150 may transmit a capability inquiry, where the band combination indicator is received based on the capability inquiry. In some examples, the capability transmitter 1150 may transmit the capability inquiry that indicates that an enhanced make before break (eMBB) band combination increases a capability size, where the band combination indicator indicates whether the eMBB band combination is supported.

The reconfiguration message transmitter 1155 may transmit a connection reconfiguration message to the UE.

The TDM pattern receiver 1170 may receive a time division multiplexing pattern from the source base station.

The control message transmitter 1175 may transmit control signaling or a control element indicating to release the connection with the source base station.

Figure 12:
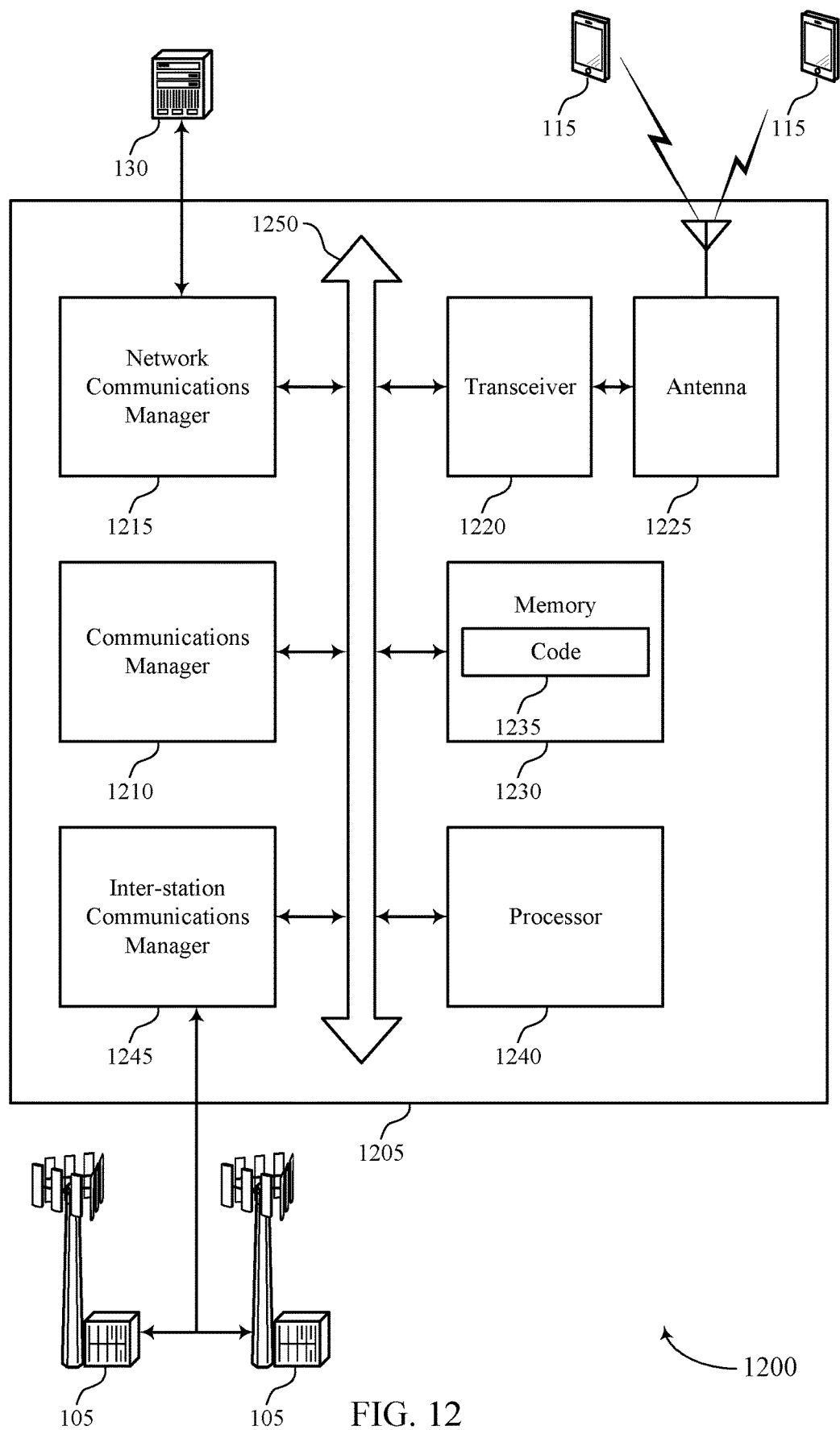
FIG. 12 shows a diagram of a system including a device that supports enhanced user equipment capability exchange during handover in accordance with aspects of the present disclosure.

FIG. 12 shows a diagram of a system 1200 including a device 1205 that supports enhanced user equipment capability exchange during handover in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a band combination indicator that indicates at least one band combination supported by a UE, transmit, to the UE, a target base station configuration to apply during handover execution and a source base station configuration to apply during handover execution based on the band combination indicator, and communicate with the UE during handover execution using a first band of the at least one band combination indicated in the source base station configuration. The communications manager 1210 may also receive, from a source base station, a source base station configuration to be applied during handover execution and at least one band combination supported by a UE, the source base station configuration indicating a first band of the at least one band combination, transmit, to the source base station, a target base station configuration to be applied during handover execution based on the source base station configuration and the at least one band combination, the target base station configuration indicating a second band of the at least one band combination, and communicate with the UE during handover execution using the second band based on the target base station configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting enhanced user equipment capability exchange during handover).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
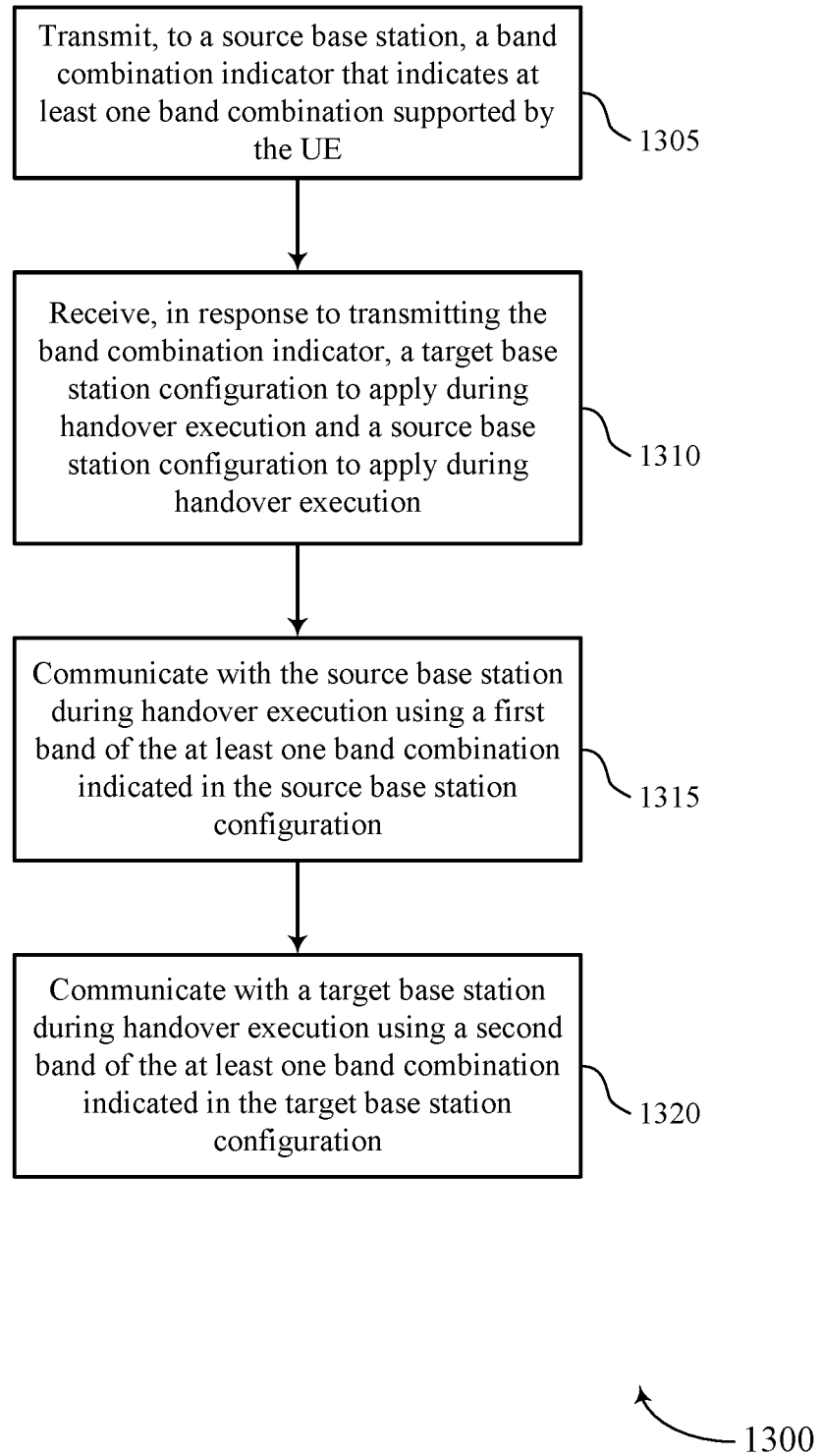
FIGS. 13 through 22 show flowcharts illustrating methods that support enhanced user equipment capability exchange during handover in accordance with aspects of the present disclosure.

FIG. 13 shows a flowchart illustrating a method 1300 that supports enhanced user equipment capability exchange during handover in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a source base station, a band combination indicator that indicates at least one band combination supported by the UE. The operations of 1305 may be performed according to the methods described herein. In some examples, aspects of the operations of 1305 may be performed by a band combination transmitter as described with reference to FIGS. 5 through 8.

At 1310, the UE may receive, in response to transmitting the band combination indicator, a target base station configuration to apply during handover execution and a source base station configuration to apply during handover execution. The operations of 1310 may be performed according to the methods described herein. In some examples, aspects of the operations of 1310 may be performed by a configuration receiver as described with reference to FIGS. 5 through 8.

At 1315, the UE may communicate with the source base station during handover execution using a first band of the at least one band combination indicated in the source base station configuration. The operations of 1315 may be performed according to the methods described herein. In some examples, aspects of the operations of 1315 may be performed by a source communication component as described with reference to FIGS. 5 through 8.

At 1320, the UE may communicate with a target base station during handover execution using a second band of the at least one band combination indicated in the target base station configuration. The operations of 1320 may be performed according to the methods described herein. In some examples, aspects of the operations of 1320 may be performed by a target communication component as described with reference to FIGS. 5 through 8.

Figure 14:
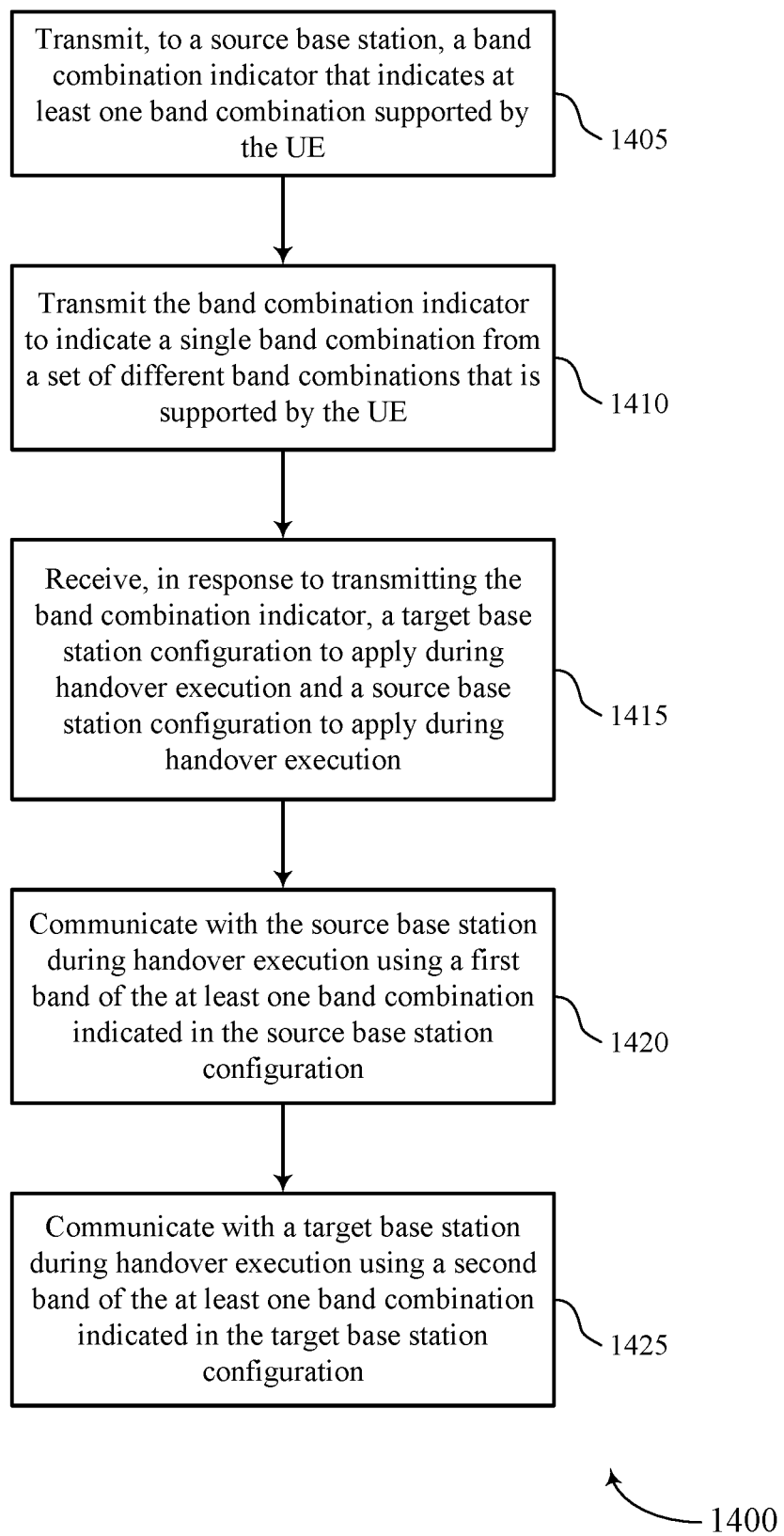

FIG. 14 shows a flowchart illustrating a method 1400 that supports enhanced user equipment capability exchange during handover in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a source base station, a band combination indicator that indicates at least one band combination supported by the UE. The operations of 1405 may be performed according to the methods described herein. In some examples, aspects of the operations of 1405 may be performed by a band combination transmitter as described with reference to FIGS. 5 through 8.

At 1410, the UE may transmit the band combination indicator to indicate a single band combination supporting handover from a set of different band combinations that is supported by the UE for carrier aggregation. The operations of 1410 may be performed according to the methods described herein. In some examples, aspects of the operations of 1410 may be performed by a band combination transmitter as described with reference to FIGS. 5 through 8.

At 1415, the UE may receive, in response to transmitting the band combination indicator, a target base station configuration to apply during handover execution and a source base station configuration to apply during handover execution. The operations of 1415 may be performed according to the methods described herein. In some examples, aspects of the operations of 1415 may be performed by a configuration receiver as described with reference to FIGS. 5 through 8.

At 1420, the UE may communicate with the source base station during handover execution using a first band of the at least one band combination indicated in the source base station configuration. The operations of 1420 may be performed according to the methods described herein. In some examples, aspects of the operations of 1420 may be performed by a source communication component as described with reference to FIGS. 5 through 8.

At 1425, the UE may communicate with a target base station during handover execution using a second band of the at least one band combination indicated in the target base station configuration. The operations of 1425 may be performed according to the methods described herein. In some examples, aspects of the operations of 1425 may be performed by a target communication component as described with reference to FIGS. 5 through 8.

Figure 15:
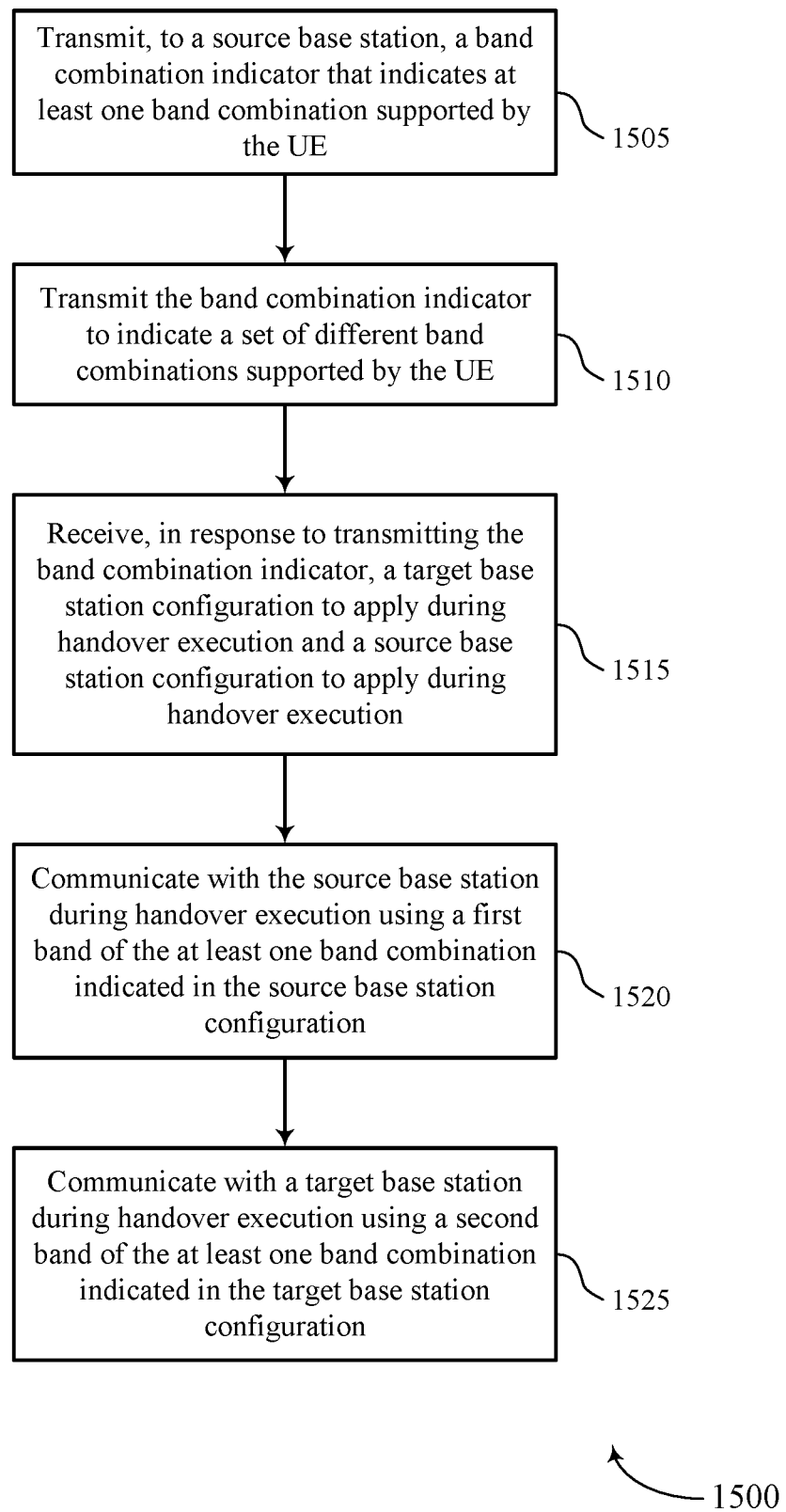

FIG. 15 shows a flowchart illustrating a method 1500 that supports enhanced user equipment capability exchange during handover in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a source base station, a band combination indicator that indicates at least one band combination supported by the UE. The operations of 1505 may be performed according to the methods described herein. In some examples, aspects of the operations of 1505 may be performed by a band combination transmitter as described with reference to FIGS. 5 through 8.

At 1510, the UE may transmit the band combination indicator to indicate a set of different band combinations supported by the UE. The operations of 1510 may be performed according to the methods described herein. In some examples, aspects of the operations of 1510 may be performed by a band combination transmitter as described with reference to FIGS. 5 through 8.

At 1515, the UE may receive, in response to transmitting the band combination indicator, a target base station configuration to apply during handover execution and a source base station configuration to apply during handover execution. The operations of 1515 may be performed according to the methods described herein. In some examples, aspects of the operations of 1515 may be performed by a configuration receiver as described with reference to FIGS. 5 through 8.

At 1520, the UE may communicate with the source base station during handover execution using a first band of the at least one band combination indicated in the source base station configuration. The operations of 1520 may be performed according to the methods described herein. In some examples, aspects of the operations of 1520 may be performed by a source communication component as described with reference to FIGS. 5 through 8.

At 1525, the UE may communicate with a target base station during handover execution using a second band of the at least one band combination indicated in the target base station configuration. The operations of 1525 may be performed according to the methods described herein. In some examples, aspects of the operations of 1525 may be performed by a target communication component as described with reference to FIGS. 5 through 8.

Figure 16:
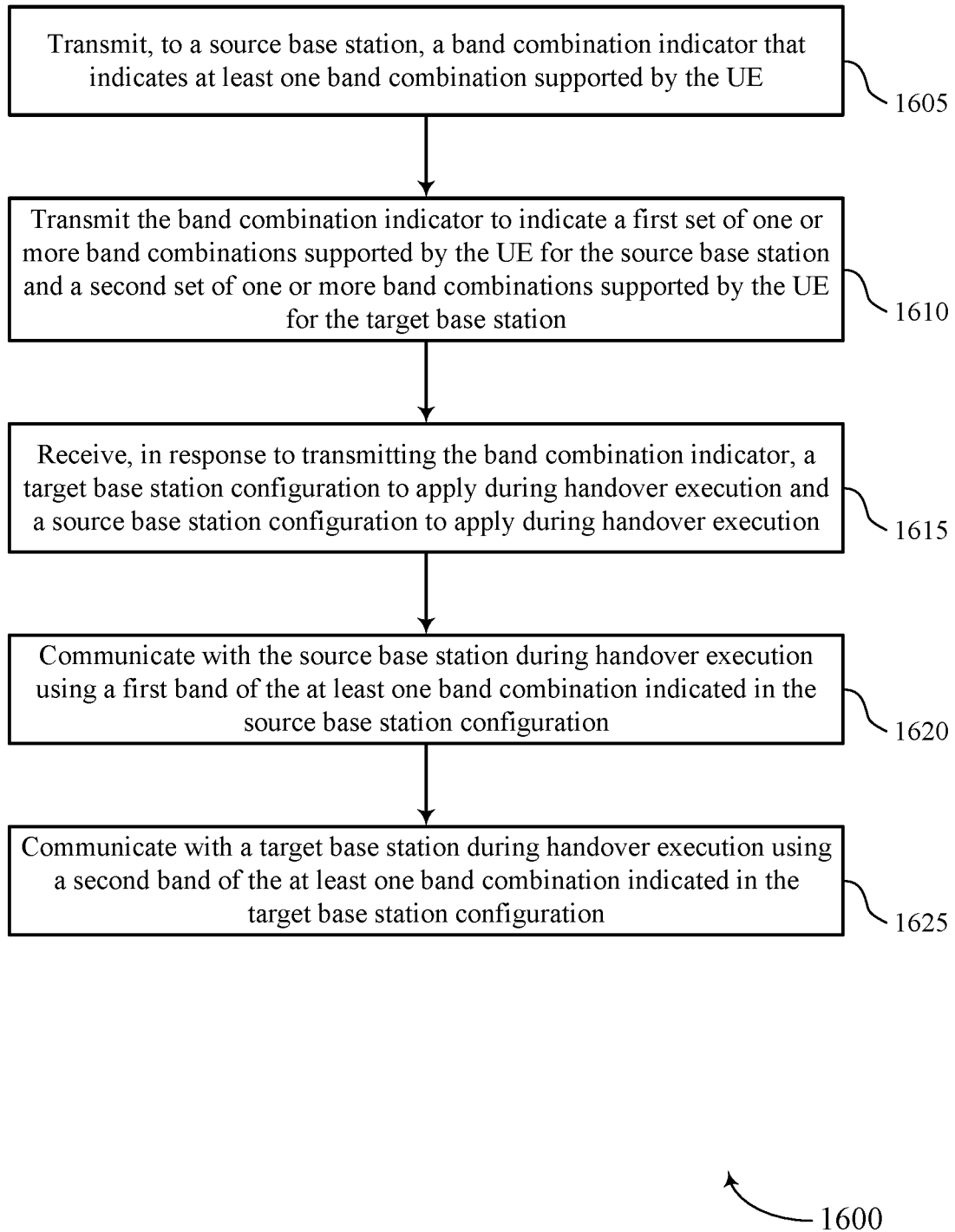

FIG. 16 shows a flowchart illustrating a method 1600 that supports enhanced user equipment capability exchange during handover in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may transmit, to a source base station, a band combination indicator that indicates at least one band combination supported by the UE. The operations of 1605 may be performed according to the methods described herein. In some examples, aspects of the operations of 1605 may be performed by a band combination transmitter as described with reference to FIGS. 5 through 8.

At 1610, the UE may transmit the band combination indicator to indicate a first set of one or more band combinations supported by the UE for the source base station and a second set of one or more band combinations supported by the UE for the target base station. The operations of 1610 may be performed according to the methods described herein. In some examples, aspects of the operations of 1610 may be performed by a band combination transmitter as described with reference to FIGS. 5 through 8.

At 1615, the UE may receive, in response to transmitting the band combination indicator, a target base station configuration to apply during handover execution and a source base station configuration to apply during handover execution. The operations of 1615 may be performed according to the methods described herein. In some examples, aspects of the operations of 1615 may be performed by a configuration receiver as described with reference to FIGS. 5 through 8.

At 1620, the UE may communicate with the source base station during handover execution using a first band of the at least one band combination indicated in the source base station configuration. The operations of 1620 may be performed according to the methods described herein. In some examples, aspects of the operations of 1620 may be performed by a source communication component as described with reference to FIGS. 5 through 8.

At 1625, the UE may communicate with a target base station during handover execution using a second band of the at least one band combination indicated in the target base station configuration. The operations of 1625 may be performed according to the methods described herein. In some examples, aspects of the operations of 1625 may be performed by a target communication component as described with reference to FIGS. 5 through 8.

Figure 17:
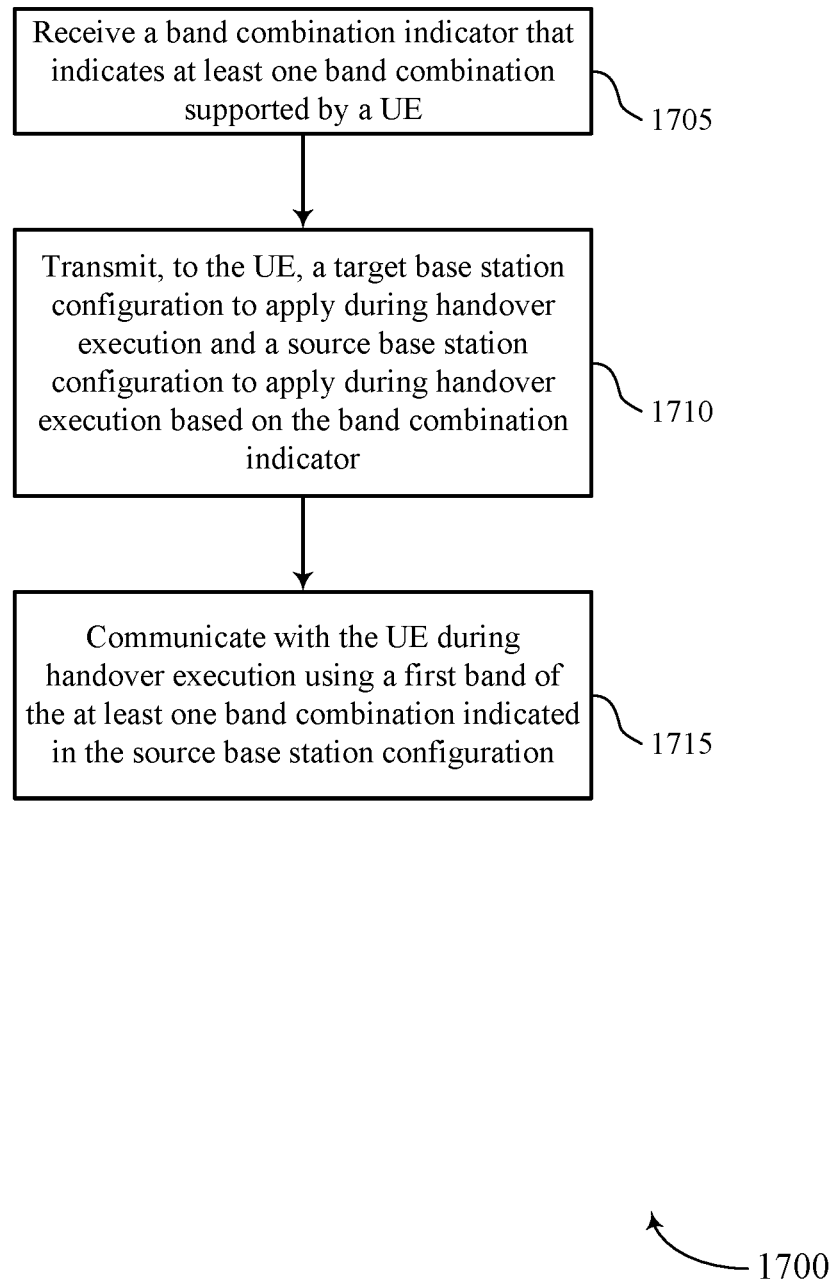

FIG. 17 shows a flowchart illustrating a method 1700 that supports enhanced user equipment capability exchange during handover in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a band combination indicator that indicates at least one band combination supported by a UE. The operations of 1705 may be performed according to the methods described herein. In some examples, aspects of the operations of 1705 may be performed by a band combination receiver as described with reference to FIGS. 9 through 12.

At 1710, the base station may transmit, to the UE, a target base station configuration to apply during handover execution and a source base station configuration to apply during handover execution based on the band combination indicator. The operations of 1710 may be performed according to the methods described herein. In some examples, aspects of the operations of 1710 may be performed by a configuration transmitter as described with reference to FIGS. 9 through 12.

At 1715, the base station may communicate with the UE during handover execution using a first band of the at least one band combination indicated in the source base station configuration. The operations of 1715 may be performed according to the methods described herein. In some examples, aspects of the operations of 1715 may be performed by a communication component as described with reference to FIGS. 9 through 12.

Figure 18:
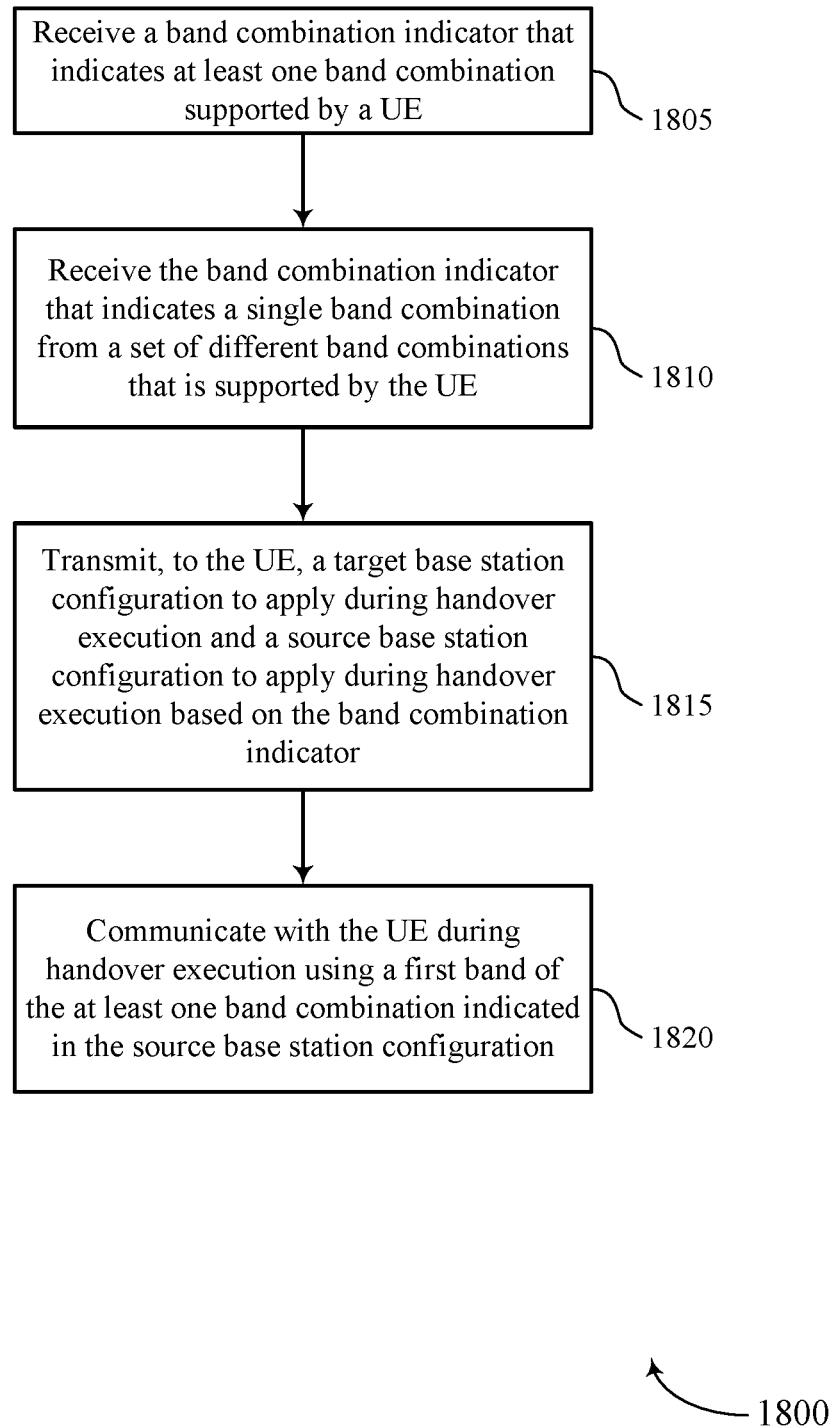

FIG. 18 shows a flowchart illustrating a method 1800 that supports enhanced user equipment capability exchange during handover in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive a band combination indicator that indicates at least one band combination supported by a UE. The operations of 1805 may be performed according to the methods described herein. In some examples, aspects of the operations of 1805 may be performed by a band combination receiver as described with reference to FIGS. 9 through 12.

At 1810, the base station may receive the band combination indicator that indicates a single band combination supporting handover from a set of different band combinations that is supported by the UE for carrier aggregation. The operations of 1810 may be performed according to the methods described herein. In some examples, aspects of the operations of 1810 may be performed by a band combination receiver as described with reference to FIGS. 9 through 12.

At 1815, the base station may transmit, to the UE, a target base station configuration to apply during handover execution and a source base station configuration to apply during handover execution based on the band combination indicator. The operations of 1815 may be performed according to the methods described herein. In some examples, aspects of the operations of 1815 may be performed by a configuration transmitter as described with reference to FIGS. 9 through 12.

At 1820, the base station may communicate with the UE during handover execution using a first band of the at least one band combination indicated in the source base station configuration. The operations of 1820 may be performed according to the methods described herein. In some examples, aspects of the operations of 1820 may be performed by a communication component as described with reference to FIGS. 9 through 12.

Figure 19:
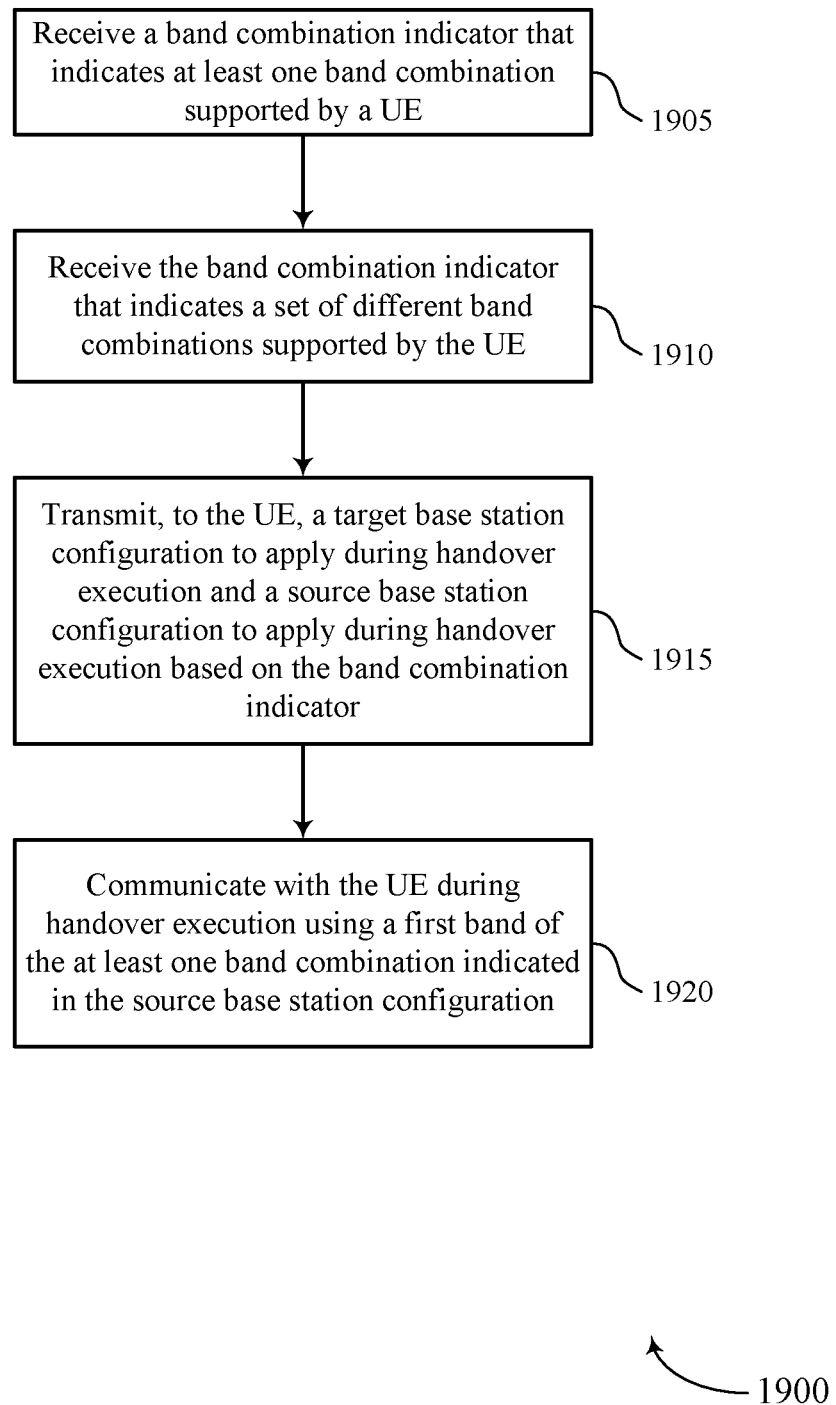

FIG. 19 shows a flowchart illustrating a method 1900 that supports enhanced user equipment capability exchange during handover in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may receive a band combination indicator that indicates at least one band combination supported by a UE. The operations of 1905 may be performed according to the methods described herein. In some examples, aspects of the operations of 1905 may be performed by a band combination receiver as described with reference to FIGS. 9 through 12.

At 1910, the base station may receive the band combination indicator that indicates a set of different band combinations supported by the UE. The operations of 1910 may be performed according to the methods described herein. In some examples, aspects of the operations of 1910 may be performed by a band combination receiver as described with reference to FIGS. 9 through 12.

At 1915, the base station may transmit, to the UE, a target base station configuration to apply during handover execution and a source base station configuration to apply during handover execution based on the band combination indicator. The operations of 1915 may be performed according to the methods described herein. In some examples, aspects of the operations of 1915 may be performed by a configuration transmitter as described with reference to FIGS. 9 through 12.

At 1920, the base station may communicate with the UE during handover execution using a first band of the at least one band combination indicated in the source base station configuration. The operations of 1920 may be performed according to the methods described herein. In some examples, aspects of the operations of 1920 may be performed by a communication component as described with reference to FIGS. 9 through 12.

Figure 20:
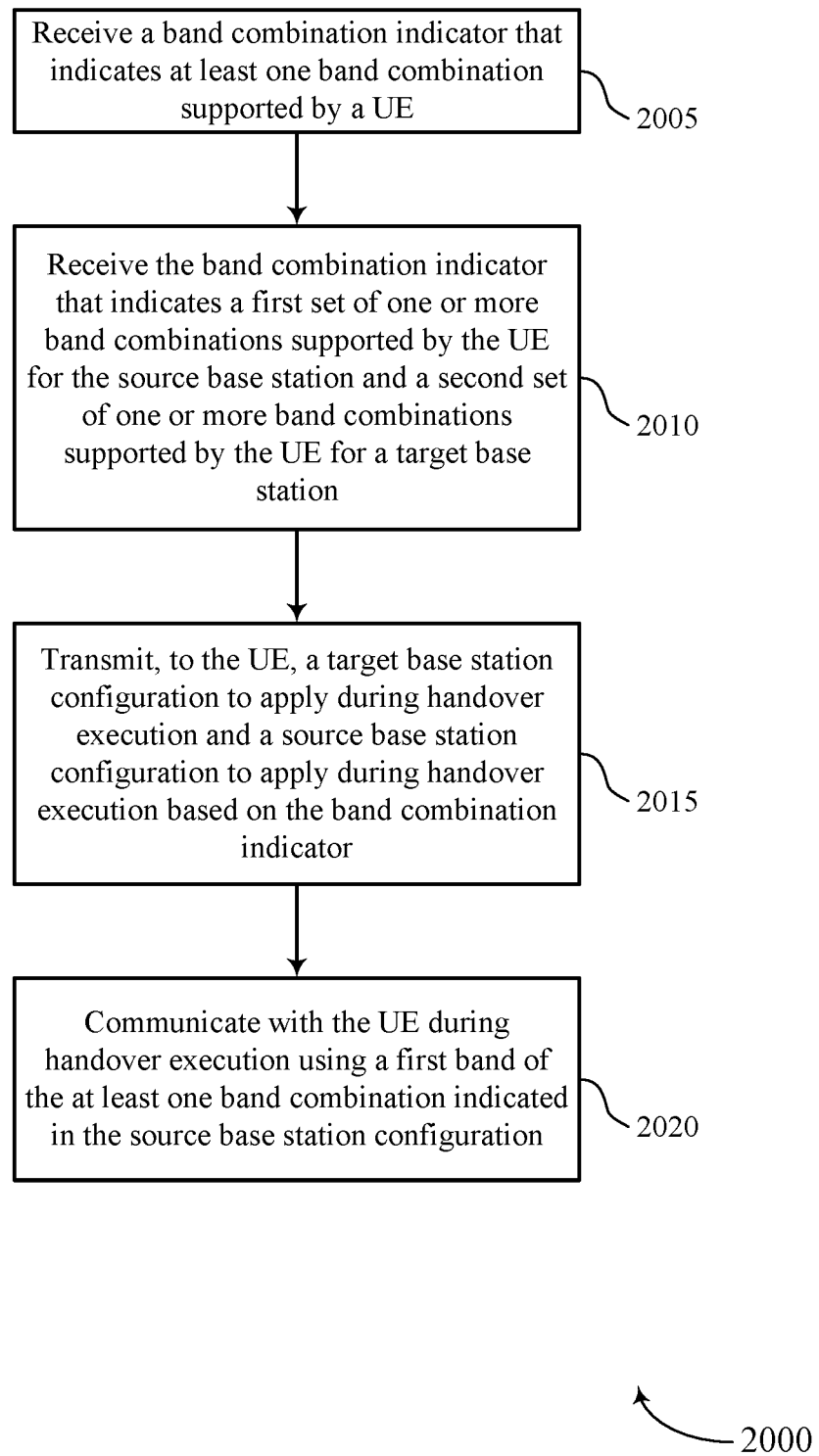

FIG. 20 shows a flowchart illustrating a method 2000 that supports enhanced user equipment capability exchange during handover in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may receive a band combination indicator that indicates at least one band combination supported by a UE. The operations of 2005 may be performed according to the methods described herein. In some examples, aspects of the operations of 2005 may be performed by a band combination receiver as described with reference to FIGS. 9 through 12.

At 2010, the base station may receive the band combination indicator that indicates a first set of one or more band combinations supported by the UE for the source base station and a second set of one or more band combinations supported by the UE for a target base station. The operations of 2010 may be performed according to the methods described herein. In some examples, aspects of the operations of 2010 may be performed by a band combination receiver as described with reference to FIGS. 9 through 12.

At 2015, the base station may transmit, to the UE, a target base station configuration to apply during handover execution and a source base station configuration to apply during handover execution based on the band combination indicator. The operations of 2015 may be performed according to the methods described herein. In some examples, aspects of the operations of 2015 may be performed by a configuration transmitter as described with reference to FIGS. 9 through 12.

At 2020, the base station may communicate with the UE during handover execution using a first band of the at least one band combination indicated in the source base station configuration. The operations of 2020 may be performed according to the methods described herein. In some examples, aspects of the operations of 2020 may be performed by a communication component as described with reference to FIGS. 9 through 12.

Figure 21:
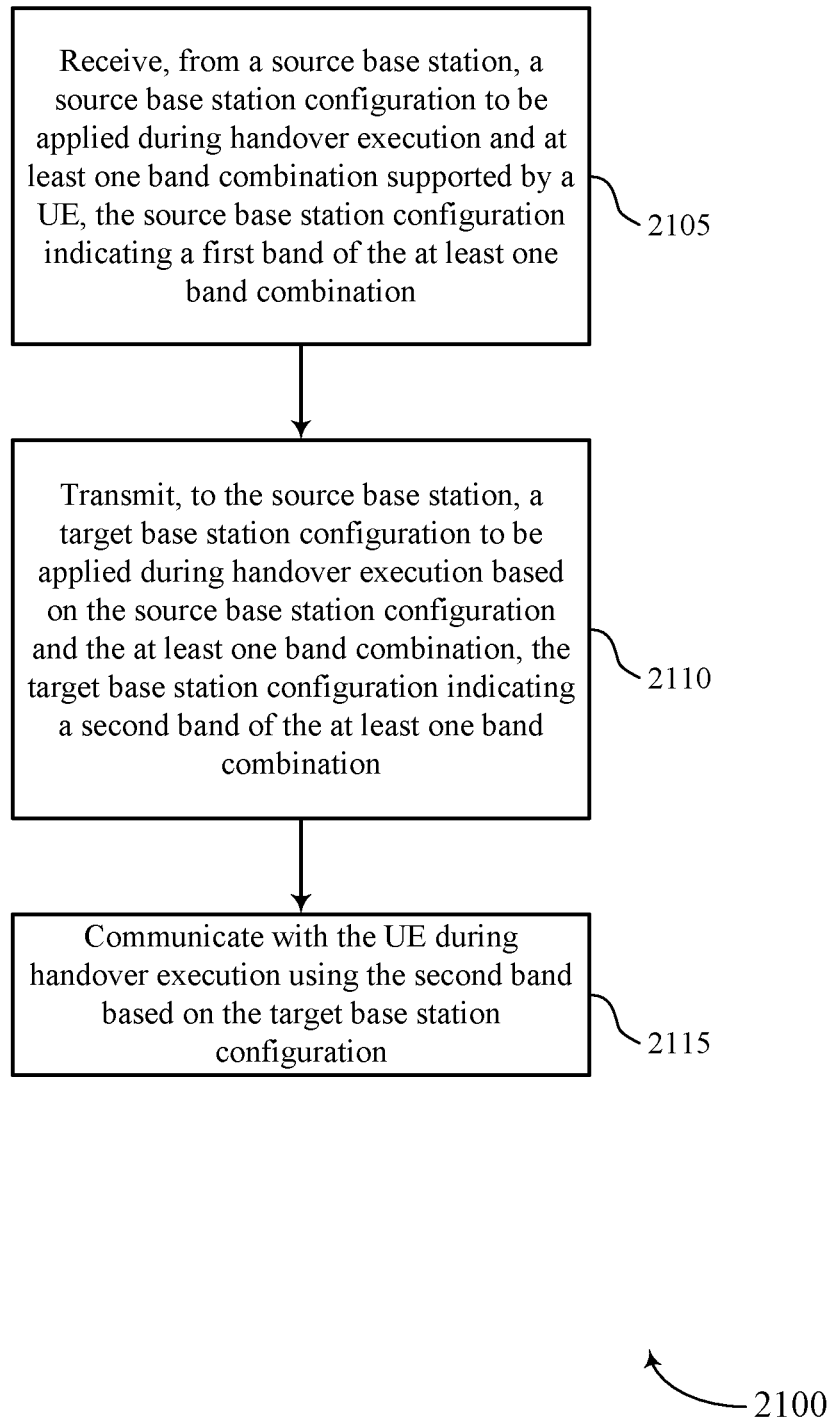

FIG. 21 shows a flowchart illustrating a method 2100 that supports enhanced user equipment capability exchange during handover in accordance with aspects of the present disclosure. The operations of method 2100 may be implemented by a base station 105 or its components as described herein. For example, the operations of method 2100 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may receive, from a source base station, a source base station configuration to be applied during handover execution and at least one band combination supported by a UE, the source base station configuration indicating a first band of the at least one band combination. The operations of 2105 may be performed according to the methods described herein. In some examples, aspects of the operations of 2105 may be performed by a source communication component as described with reference to FIGS. 9 through 12.

At 2110, the base station may transmit, to the source base station, a target base station configuration to be applied during handover execution based on the source base station configuration and the at least one band combination, the target base station configuration indicating a second band of the at least one band combination. The operations of 2110 may be performed according to the methods described herein. In some examples, aspects of the operations of 2110 may be performed by a target communication component as described with reference to FIGS. 9 through 12.

At 2115, the base station may communicate with the UE during handover execution using the second band based on the target base station configuration. The operations of 2115 may be performed according to the methods described herein. In some examples, aspects of the operations of 2115 may be performed by a communication component as described with reference to FIGS. 9 through 12.

Figure 22:
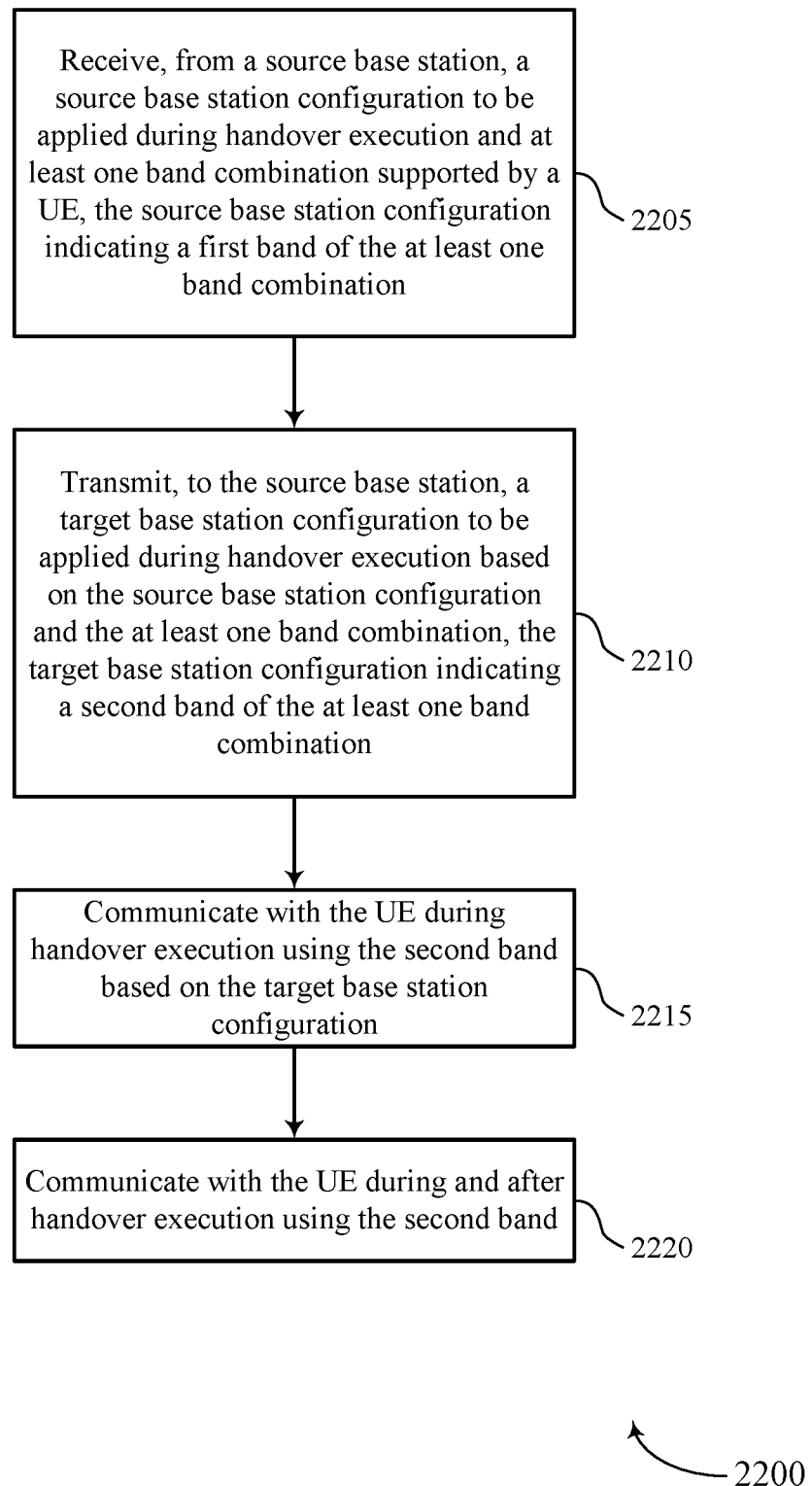

FIG. 22 shows a flowchart illustrating a method 2200 that supports enhanced user equipment capability exchange during handover in accordance with aspects of the present disclosure. The operations of method 2200 may be implemented by a base station 105 or its components as described herein. For example, the operations of method 2200 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2205, the base station may receive, from a source base station, a source base station configuration to be applied during handover execution and at least one band combination supported by a UE, the source base station configuration indicating a first band of the at least one band combination. The operations of 2205 may be performed according to the methods described herein. In some examples, aspects of the operations of 2205 may be performed by a source communication component as described with reference to FIGS. 9 through 12.

At 2210, the base station may transmit, to the source base station, a target base station configuration to be applied during handover execution based on the source base station configuration and the at least one band combination, the target base station configuration indicating a second band of the at least one band combination. The operations of 2210 may be performed according to the methods described herein. In some examples, aspects of the operations of 2210 may be performed by a target communication component as described with reference to FIGS. 9 through 12.

At 2215, the base station may communicate with the UE during handover execution using the second band based on the target base station configuration. The operations of 2215 may be performed according to the methods described herein. In some examples, aspects of the operations of 2215 may be performed by a communication component as described with reference to FIGS. 9 through 12.

At 2220, the base station may communicate with the UE during and after handover execution using the second band. The operations of 2220 may be performed according to the methods described herein. In some examples, aspects of the operations of 2220 may be performed by a communication component as described with reference to FIGS. 9 through 12.

Embodiment 1: A method for wireless communications by a user equipment (UE), comprising: transmitting, to a source base station, a band combination indicator that indicates at least one band combination supported by the UE; receiving, in response to transmitting the band combination indicator, a target base station configuration to apply during handover execution and a source base station configuration to apply during handover execution; communicating with the source base station during handover execution using a first band of the at least one band combination indicated in the source base station configuration; and communicating with a target base station during handover execution using a second band of the at least one band combination indicated in the target base station configuration.

Embodiment 2: The method of embodiment 1, wherein transmitting the band combination indicator comprises: transmitting the band combination indicator to indicate a single band combination supporting handover from a plurality of different band combinations that is supported by the UE for carrier aggregation.

Embodiment 3: The method of any of embodiments 1 to 2, wherein transmitting the band combination indicator comprises: transmitting the band combination indicator to indicate a plurality of different band combinations supported by the UE.

Embodiment 4: The method of any of embodiments 1 to 3, wherein transmitting the band combination indicator comprises: transmitting the band combination indicator to indicate a first set of one or more band combinations supported by the UE for the source base station and a second set of one or more band combinations supported by the UE for the target base station.

Embodiment 5: The method of embodiment 4, wherein the first set of one or more band combinations is different than the second set of band combinations.

Embodiment 6: The method of any of embodiments 1 to 5, wherein transmitting the band combination indicator comprises: transmitting the band combination indicator to indicate a plurality of band combinations that are interchangeably supported by the UE for the source base station and the target base station.

Embodiment 7: The method of any of embodiments 1 to 6, wherein transmitting the band combination indicator comprises: transmitting the band combination indicator to indicate a first band combination supported by the UE for the source base station and a second band combination supported by the UE for the target base station; and transmitting a pointer to indicate that one or more of the first band combination, the second band combination, or both, are individually supported by the UE.

Embodiment 8: The method of any of embodiments 1 to 7, wherein transmitting the band combination indicator comprises: transmitting the band combination indicator that comprises a group identifier to indicate a first band combination that is interchangeably supported by the UE for the source base station and the target base station.

Embodiment 9: The method of any of embodiments 1 to 8, further comprising: receiving a handover instruction to handover the UE from the source base station to the target base station; and communicating with the source base station after handover execution using the first band and communicating with the target base station after handover execution using the second band.

Embodiment 10: The method of any of embodiments 1 to 9, further comprising: receiving a time division multiplexing pattern; receiving a handover instruction to handover the UE from the source base station to the target base station; and communicating with the source base station after handover execution using the first band and communicating with the target base station after handover execution using the second band based at least in part on the time division multiplexing pattern.

Embodiment 11: The method of any of embodiments 1 to 10, further comprising: receiving, based at least in part on the band combination indicator, a second target base station configuration to apply after releasing a connection with the source base station by the UE; releasing the connection with the source base station; and communicating with the target base station after releasing the connection using the first band, the second band, or both, based at least in part on the second target base station configuration.

Embodiment 12: The method of any of embodiments 1 to 11, further comprising: transmitting at least one control message to indicate one or more of intra-frequency handover support for a given band, inter-frequency handover support for intra-band and inter-band combinations, asynchronous handover support, time division multiplexing support, radio frequency chain capability, or any combination thereof.

Embodiment 13: The method of embodiment 12, wherein the control message is an information element indicated for a band combination supporting enhanced make before break (eMBB) handover.

Embodiment 14: The method of any of embodiments 1 to 13, wherein transmitting the band combination indicator comprises: transmitting the band combination indicator that indicates a first band combination that is not a fallback of a different band combination.

Embodiment 15: The method of any of embodiments 1 to 14, wherein transmitting the band combination indicator comprises: transmitting the band combination indicator that indicates at least one enhanced make before break (eMBB) band combination that is a fallback of a non-eMBB band combination.

Embodiment 16: The method of any of embodiments 1 to 15, wherein transmitting the band combination indicator comprises: transmitting the band combination indicator that indicates an enhanced make before break (eMBB) band combination that is a fallback of a different band combination of the at least one band combination.

Embodiment 17: The method of any of embodiments 1 to 16, further comprising: receiving a capability inquiry, wherein the band combination indicator is transmitted based at least in part on the capability inquiry.

Embodiment 18: The method of embodiment 17, wherein receiving the capability inquiry comprises: receiving the capability inquiry that indicates that an enhanced make before break (eMBB) band combination increases a capability size, wherein the band combination indicator indicates whether the eMBB band combination is supported.

Embodiment 19: The method of any of embodiments 1 to 18, further comprising: receiving a connection reconfiguration message from the source base station.

Embodiment 20: The method of embodiment 19, further comprising: maintaining a primary cell connection with the source base station based at least in part on the connection reconfiguration message; and releasing or deactivating at least one secondary cell connection with the source base station based at least in part on the connection reconfiguration message.

Embodiment 21: The method of embodiments 19 to 20, further comprising: establishing a primary cell connection with the target base station based at least in part on the connection reconfiguration message.

Embodiment 22: The method of embodiment 21, further comprising: establishing at least one secondary cell connection with the target base station based at least in part on the connection reconfiguration message.

Embodiment 23: The method of embodiment 21, further comprising determining that the connection reconfiguration message instructs the UE to establish a number of connections that exceeds a capability of the UE; and skipping configuring or deactivating at least one secondary cell connection for the target base station to comply with the capability.

Embodiment 24: The method of embodiment 21, wherein the capability is a carrier aggregation capability, a multiple input multiple output (MIMO) capability of the UE, or both.

Embodiment 25: The method of any of embodiments 1 to 24, wherein the handover is an enhanced make before break handover.

Embodiment 26: The method of any of embodiments 1 to 25, wherein the first band and the second band are the same, or the first band and the second band are different, or the first band and the second band at least partially overlap.

Embodiment 27: A method for wireless communications by a source base station, comprising: receiving a band combination indicator that indicates at least one band combination supported by a user equipment (UE); transmitting, to the UE, a target base station configuration to apply during handover execution and a source base station configuration to apply during handover execution based at least in part on the band combination indicator; and communicating with the UE during handover execution using a first band of the at least one band combination indicated in the source base station configuration.

Embodiment 28: The method of embodiment 27, wherein receiving the band combination indicator comprises: receiving the band combination indicator that indicates a single band combination supporting handover from a plurality of different band combinations that is supported by the UE for carrier aggregation.

Embodiment 29: The method of any of embodiments 27 to 28, wherein receiving the band combination indicator comprises: receiving the band combination indicator that indicates a plurality of different band combinations supported by the UE.

Embodiment 30: The method of any of embodiments 27 to 29, wherein receiving the band combination indicator comprises: receiving the band combination indicator that indicates a first set of one or more band combinations supported by the UE for the source base station and a second set of one or more band combinations supported by the UE for a target base station.

Embodiment 31: The method of embodiment 30, wherein the first set of one or more band combinations is different than the second set of band combinations.

Embodiment 32: The method of any of embodiments 27 to 31, wherein receiving the band combination indicator comprises: receiving the band combination indicator that indicates a plurality of band combinations that are interchangeably supported by the UE for the source base station and a target base station.

Embodiment 33: The method of any of embodiments 27 to 32, wherein receiving the band combination indicator comprises: receiving the band combination indicator that indicates a first band combination supported by the UE for the source base station and a second band combination supported by the UE for a target base station; and receiving a pointer to indicate that one or more of the first band combination, the second band combination, or both, are individually supported by the UE.

Embodiment 34: The method of any of embodiments 27 to 33, wherein receiving the band combination indicator comprises: receiving the band combination indicator that comprises a group identifier to indicate a first band combination that is interchangeably supported by the UE for the source base station and a target base station.

Embodiment 35: The method of any of embodiments 27 to 34, further comprising: transmitting a handover instruction to the UE; and communicating with the UE during and after handover execution using the first band.

Embodiment 36: The method of any of embodiments 27 to 35, further comprising: transmitting a time division multiplexing pattern; transmitting a handover instruction to the UE; and communicating with the UE during and after handover execution using the first band based at least in part on the time division multiplexing pattern.

Embodiment 37: The method of any of embodiments 27 to 36, further comprising: transmitting, based at least in part on the band combination indicator, a second target base station configuration for the UE to apply after releasing a connection with the source base station.

Embodiment 38: The method of any of embodiments 27 to 36, further comprising: receiving at least one control message to indicate one or more of intra-frequency handover support for a given band, inter-frequency handover support for intra-band and inter-band combinations, asynchronous handover support, time division multiplexing support, radio frequency chain capability, or any combination thereof.

Embodiment 39: The method of embodiment 38, wherein the control message is an information element indicated for a band combination supporting enhanced make before break (eMBB) handover.

Embodiment 40: The method of any of embodiments 27 to 39, wherein receiving the band combination indicator comprises: receiving the band combination indicator that indicates a first band combination that is not a fallback of a different band combination.

Embodiment 41: The method of any of embodiments 27 to 40, wherein receiving the band combination indicator comprises: receiving the band combination indicator that indicates at least one enhanced make before break (eMBB) band combination that is a fallback of a non-eMBB band combination.

Embodiment 42: The method of any of embodiments 27 to 41, wherein receiving the band combination indicator comprises: receiving the band combination indicator that indicates at least one band combination that is a fallback of a different band combination and is a supported band combination in enhanced make before break (eMBB).

Embodiment 43: The method of any of embodiments 27 to 42, further comprising: transmitting a capability inquiry, wherein the band combination indicator is received based at least in part on the capability inquiry.

Embodiment 44: The method of embodiment 43, wherein transmitting the capability inquiry comprises: transmitting the capability inquiry that indicates that an enhanced make before break (eMBB) band combination increases a capability size, wherein the band combination indicator indicates whether the eMBB band combination is supported.

Embodiment 45: The method of any of embodiments 27 to 44, further comprising: transmitting a connection reconfiguration message to the UE.

Embodiment 46: The method of any of embodiments 27 to 45, wherein the handover is an enhanced make before break handover.

Embodiment 47: The method of any of embodiments 27 to 46, further comprising: transmitting, to the UE, the target base station configuration to apply during handover execution.

Embodiment 48: The method of embodiment 47, wherein transmitting the target base station configuration to apply during handover execution comprises: transmitting the target base station configuration to apply during handover execution and a modified source base station configuration to apply during handover execution.

Embodiment 49: The method of any of embodiments 47 to 48, further comprising: transmitting, to the UE, a second target base station configuration to apply after handover of the UE and after release of the source base station by the UE.

Embodiment 50: The method of any of embodiments 47 to 49, wherein the first band is the same as, at least partially overlaps with, or is different than a second band of the at least one band combination indicated in the target base station configuration.

Embodiment 51: A method for wireless communications by a target base station, comprising: receiving, from a source base station, an updated source base station configuration to be applied during handover execution and at least one band combination supported by a user equipment (UE), the source base station configuration indicating a first band of the at least one band combination; transmitting, to the source base station, a target base station configuration to be applied during handover execution based at least in part on the source base station configuration and the at least one band combination, the target base station configuration indicating a second band of the at least one band combination; and communicating with the UE during handover execution using the second band based at least in part on the target base station configuration.

Embodiment 52: The method of embodiment 51 further comprising: communicating with the UE during and after handover execution using the second band.

Embodiment 53: The method of any of embodiments 51 to 52, further comprising: receiving a time division multiplexing pattern from the source base station; and communicating with the UE during and after handover execution using the second band based at least in part on the time division multiplexing pattern.

Embodiment 54: The method of any of embodiments 51 to 53, further comprising: transmitting, to the source base station, a second target base station configuration for the UE to apply after releasing a connection with the source base station.

Embodiment 55: The method of embodiment 54, further comprising: transmitting control signaling or a control element indicating to release the connection with the source base station; and communicating with the UE based at least in part on the second target base station configuration.

Embodiment 56: The method of any of embodiments 54 to 55, further comprising: transmitting, to the UE, a target base station configuration to be applied after handover execution and after release of the source base station.

Embodiment 57: The method of any of embodiments 54 to 56, wherein the first band and the second band are the same, or the first band and the second band are different, or the first band and the second band at least partially overlap.

Embodiment 58: An apparatus comprising at least one means for performing a method of any of embodiments 1 to 26 and 67 to 69.

Embodiment 59: An apparatus comprising at least one means for performing a method of any of embodiments 27 to 50 and 67 to 69.

Embodiment 60: An apparatus comprising at least one means for performing a method of any of embodiments 51 to 57 and 67 to 69.

Embodiment 61: An apparatus for wireless communications comprising a processor; memory in electronic communication with the processor; and instructions stored in the memory and executable by the processor to cause the apparatus to perform a method of any of embodiments 1 to 26 and 67 to 69.

Embodiment 62: An apparatus for wireless communications comprising a processor; memory in electronic communication with the processor; and instructions stored in the memory and executable by the processor to cause the apparatus to perform a method of any of embodiments 27 to 50 and 67 to 69.

Embodiment 63: An apparatus for wireless communications comprising a processor; memory in electronic communication with the processor; and instructions stored in the memory and executable by the processor to cause the apparatus to perform a method of any of embodiments 51 to 57 and 67 to 69.

Embodiment 64: A non-transitory computer-readable medium storing code for wireless communications, the code comprising instructions executable by a processor to perform a method of any of embodiments 1 to 26 and 67 to 69.

Embodiment 65: A non-transitory computer-readable medium storing code for wireless communications, the code comprising instructions executable by a processor to perform a method of any of embodiments 27 to 50 and 67 to 69.

Embodiment 66: A non-transitory computer-readable medium storing code for wireless communications, the code comprising instructions executable by a processor to perform a method of any of embodiments 51 to 57 and 67 to 69.

Embodiment 67: The method of any of embodiments 1, 17, or 18, further comprising: transmitting capability signaling that indicates the UE supports eMBB handover based on a UE-supported carrier aggregation (CA) band combination.

Embodiment 68: The method of embodiment 27, further comprising: transmitting, to the target base station, the updated source base station configuration, a power sharing configuration for handover, and one or more UE capabilities including an indication that the UE supports eMBB handover, and receiving the target base station configuration in response to transmitting the source base station configuration and the indication.

Embodiment 69: The method of embodiment 51, further comprising: receiving an indication that the UE supports eMBB handover based on a UE-supported carrier aggregation (CA) band combination.

Embodiment 70: The method of embodiment 27, further comprising identifying a maximum UE capability associated with the at least one band combination supported by the UE and identifying the source base station configuration that is an updated source base station configuration, wherein a combination of the updated source base station configuration and the target base station configuration does not exceed the maximum UE capability, and wherein the source base station configuration is transmitted to the UE based at least in part on the determining.

Embodiment 71: The method of embodiment 51, further comprising: receiving an indication of one or more capabilities of the UE associated with the at least one band combination supported by the UE and determining the target base station configuration based at least in part on the source base station configuration and the one or more capabilities of the UE.

Embodiment 72: The method of any of embodiments 51 to 53, further comprising: receiving power sharing information from the source base station, the power sharing information associated with how the UE allocates transmission power between the source base station and target base station during handover execution, transmitting the target base station configuration to be applied during handover execution based at least in part on the power sharing information.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   transmitting, to a source base station, a band combination indicator that indicates at least one band combination supported by the UE;
   receiving, in response to transmitting the band combination indicator, a target base station configuration to apply during handover execution and a source base station configuration to apply during handover execution, wherein the target base station configuration is based on the source base station configuration;
   communicating with the source base station during handover execution using a first band of the at least one band combination indicated in the source base station configuration; and
   communicating with a target base station during handover execution using a second band of the at least one band combination indicated in the target base station configuration.

2. The method of claim 1, further comprising:
   receiving a capability inquiry, wherein the band combination indicator is transmitted based at least in part on the capability inquiry.

3. The method of claim 1, further comprising:
   transmitting capability signaling that indicates the UE supports enhanced make before break (eMBB) handover based on a UE-supported carrier aggregation band combination.

4. The method of claim 1, further comprising:
   transmitting at least one control message to indicate one or more of intra-frequency handover support for a given band, inter-frequency handover support for intra-band and inter-band combinations, asynchronous handover support, time division multiplexing support, radio frequency chain capability, or any combination thereof.

5. The method of claim 4, wherein the at least one control message is an information element indicated for a band combination supporting enhanced make before break (eMBB) handover.

6. The method of claim 1, wherein transmitting the band combination indicator comprises:
transmitting the band combination indicator to indicate a single band combination supporting handover from a plurality of different band combinations that is supported by the UE for carrier aggregation.

7. The method of claim 1, wherein transmitting the band combination indicator comprises:
transmitting the band combination indicator to indicate a plurality of different band combinations supported by the UE for carrier aggregation.

8. The method of claim 1, wherein transmitting the band combination indicator comprises:
transmitting the band combination indicator to indicate a first set of one or more band combinations supported by the UE for the source base station and a second set of one or more band combinations supported by the UE for the target base station.

9. The method of claim 8, wherein the first set of one or more band combinations is different than the second set of band combinations.

10. The method of claim 1, wherein transmitting the band combination indicator comprises:
transmitting the band combination indicator to indicate a plurality of band combinations that are interchangeably supported by the UE for the source base station and the target base station.

11. The method of claim 1, wherein transmitting the band combination indicator comprises:
transmitting the band combination indicator to indicate a first band combination supported by the UE for the source base station and a second band combination supported by the UE for the target base station; and
transmitting a pointer to indicate that one or more of the first band combination, the second band combination, or both, are individually supported by the UE.

12. The method of claim 1, wherein transmitting the band combination indicator comprises:
transmitting the band combination indicator that comprises a group identifier to indicate a first band combination that is interchangeably supported by the UE for the source base station and the target base station.

13. The method of claim 1, further comprising:
receiving a handover instruction to handover the UE from the source base station to the target base station; and
communicating with the source base station after handover execution using the first band and communicating with the target base station after handover execution using the second band.

14. The method of claim 1, further comprising:
receiving a time division multiplexing pattern;
receiving a handover instruction to handover the UE from the source base station to the target base station; and
communicating with the source base station after handover execution using the first band and communicating with the target base station after handover execution using the second band based at least in part on the time division multiplexing pattern.

15. The method of claim 1, further comprising:
receiving, based at least in part on the band combination indicator, a second target base station configuration to apply after releasing a connection with the source base station by the UE;
releasing the connection with the source base station; and
communicating with the target base station after releasing the connection using the first band, the second band, or both, based at least in part on the second target base station configuration.

16. The method of claim 1, wherein transmitting the band combination indicator comprises:
transmitting the band combination indicator that indicates a first band combination that is not a fallback of a different band combination.

17. The method of claim 1, wherein transmitting the band combination indicator comprises:
transmitting the band combination indicator that indicates at least one enhanced make before break (eMBB) band combination that is a fallback of a non-eMBB band combination.

18. The method of claim 1, wherein transmitting the band combination indicator comprises:
transmitting the band combination indicator that indicates an enhanced make before break (eMBB) band combination that is a fallback of a different band combination of the at least one band combination.

19. The method of claim 1, further comprising:
receiving a connection reconfiguration message from the source base station.

20. The method of claim 19, further comprising:
maintaining a primary cell connection with the source base station based at least in part on the connection reconfiguration message; and
releasing or deactivating at least one secondary cell connection with the source base station based at least in part on the connection reconfiguration message.

21. The method of claim 19, further comprising:
establishing a primary cell connection with the target base station based at least in part on the connection reconfiguration message.

22. The method of claim 21, further comprising:
establishing at least one secondary cell connection with the target base station based at least in part on the connection reconfiguration message.

23. The method of claim 21, further comprising:
determining that the connection reconfiguration message instructs the UE to establish a number of connections that exceeds a capability of the UE; and
skipping configuring or deactivating at least one secondary cell connection for the target base station to comply with the capability.

24. The method of claim 23, wherein the capability is a carrier aggregation capability, a multiple input multiple output (MIMO) capability of the UE, or both.

25. The method of claim 1, wherein the handover is an enhanced make before break handover.

26. The method of claim 1, wherein the first band and the second band are the same, or the first band and the second band are different, or the first band and the second band at least partially overlap.

27. A method for wireless communications by a source base station, comprising:
receiving a band combination indicator that indicates at least one band combination supported by a user equipment (UE);

transmitting, to the UE, a target base station configuration to apply during handover execution and a source base station configuration to apply during handover execution based at least in part on the band combination indicator, wherein the target base station configuration is based on the source base station configuration; and communicating with the UE during handover execution using a first band of the at least one band combination indicated in the source base station configuration.

28. The method of claim 27, further comprising:
identifying a maximum UE capability associated with the at least one band combination supported by the UE; and
identifying the source base station configuration that is an updated source base station configuration, wherein a combination of the updated source base station configuration and the target base station configuration does not exceed the maximum UE capability, and wherein the source base station configuration is transmitted to the UE based at least in part on the determining.

29. The method of claim 28 further comprising:
transmitting, to the target base station, the updated source base station configuration, a power sharing configuration for handover, and one or more UE capabilities including an indication that the UE supports enhanced make before break (eMBB) handover; and
receiving the target base station configuration in response to transmitting the source base station configuration and the indication.

30. The method of claim 27, wherein receiving the band combination indicator comprises:
receiving the band combination indicator that indicates a single band combination supporting handover from a plurality of different band combinations that is supported by the UE for carrier aggregation.

31. The method of claim 27, further comprising:
receiving, from the UE, at least one control message to indicate one or more of intra-frequency handover support for a given band, inter-frequency handover support for intra-band and inter-band combinations, asynchronous handover support, time division multiplexing support, radio frequency chain capability, or any combination thereof.

32. The method of claim 31, wherein the at least one control message is an information element indicated for a band combination supporting enhanced make before break (eMBB) handover.

33. The method of claim 27, wherein receiving the band combination indicator comprises:
receiving the band combination indicator that indicates a plurality of different band combinations supported by the UE.

34. The method of claim 27, further comprising:
transmitting a capability inquiry to the UE, wherein the band combination indicator is received based at least in part on the capability inquiry.

35. The method of claim 27, wherein transmitting the target base station configuration to apply during handover execution comprises:
transmitting the target base station configuration to apply during handover execution and a modified source base station configuration to apply during handover execution.

36. The method of claim 27, further comprising:
transmitting, to the UE, a second target base station configuration to apply after handover of the UE and after release of the source base station by the UE.

37. The method of claim 27, wherein the first band is the same as, at least partially overlaps with, or is different than a second band of the at least one band combination indicated in the target base station configuration.

38. The method of claim 27, wherein receiving the band combination indicator comprises:
receiving the band combination indicator that indicates a first set of one or more band combinations supported by the UE for the source base station and a second set of one or more band combinations supported by the UE for a target base station.

39. The method of claim 38, wherein the first set of one or more band combinations is different than the second set of band combinations.

40. The method of claim 27, wherein receiving the band combination indicator comprises:
receiving the band combination indicator that indicates a plurality of band combinations that are interchangeably supported by the UE for the source base station and a target base station.

41. The method of claim 27, wherein receiving the band combination indicator comprises:
receiving the band combination indicator that indicates a first band combination supported by the UE for the source base station and a second band combination supported by the UE for a target base station; and
receiving a pointer to indicate that one or more of the first band combination, the second band combination, or both, are individually supported by the UE.

42. The method of claim 27, wherein receiving the band combination indicator comprises:
receiving the band combination indicator that comprises a group identifier to indicate a first band combination that is interchangeably supported by the UE for the source base station and a target base station.

43. The method of claim 27, further comprising:
transmitting a handover instruction to the UE; and
communicating with the UE during and after handover execution using the first band.

44. The method of claim 27, further comprising:
transmitting a time division multiplexing pattern;
transmitting a handover instruction to the UE; and
communicating with the UE during and after handover execution using the first band based at least in part on the time division multiplexing pattern.

45. The method of claim 27, further comprising:
transmitting, based at least in part on the band combination indicator, a second target base station configuration for the UE to apply after releasing a connection with the source base station.

46. The method of claim 27, further comprising:
receiving at least one control message to indicate one or more of intra-frequency handover support for a given band, inter-frequency handover support for intra-band and inter-band combinations, asynchronous handover support, time division multiplexing support, radio frequency chain capability, or any combination thereof.

47. The method of claim 46, wherein the at least one control message is an information element indicated for a band combination supporting enhanced make before break (eMBB) handover.

48. The method of claim 27, wherein receiving the band combination indicator comprises:
receiving the band combination indicator that indicates a first band combination that is not a fallback of a different band combination.

49. The method of claim 27, wherein receiving the band combination indicator comprises:
   receiving the band combination indicator that indicates at least one enhanced make before break (eMBB) band combination that is a fallback of a non-eMBB band combination.

50. The method of claim 27, wherein receiving the band combination indicator comprises:
   receiving the band combination indicator that indicates at least one band combination that is a fallback of a different band combination and is a supported band combination in enhanced make before break (eMBB).

51. The method of claim 27, further comprising:
   transmitting a connection reconfiguration message to the UE.

52. The method of claim 27, wherein the handover is an enhanced make before break (eMBB) handover.

53. An apparatus for wireless communications by a user equipment (UE), comprising:
   a processor,
   memory coupled with the processor; and
   instructions stored in the memory and executable by the processor to cause the apparatus to:
   transmit, to a source base station, a band combination indicator that indicates at least one band combination supported by the UE;
   receive, in response to transmitting the band combination indicator, a target base station configuration to apply during handover execution and a source base station configuration to apply during handover execution, wherein the target base station configuration is based on the source base station configuration;
   communicate with the source base station during handover execution using a first band of the at least one band combination indicated in the source base station configuration; and
   communicate with a target base station during handover execution using a second band of the at least one band combination indicated in the target base station configuration.

54. An apparatus for wireless communications by a source base station, comprising:
   a processor,
   memory coupled with the processor; and
   instructions stored in the memory and executable by the processor to cause the apparatus to:
   receive a band combination indicator that indicates at least one band combination supported by a user equipment (UE);
   transmit, to the UE, a target base station configuration to apply during handover execution and a source base station configuration to apply during handover execution based at least in part on the band combination indicator, wherein the target base station configuration is based on the source base station configuration; and
   communicate with the UE during handover execution using a first band of the at least one band combination indicated in the source base station configuration.

* * * * *